(12) United States Patent
Casey et al.

(10) Patent No.: US 8,050,281 B2
(45) Date of Patent: *Nov. 1, 2011

(54) ALERT GATEWAY, SYSTEMS AND METHODS

(75) Inventors: Steven M. Casey, Littleton, CO (US); Bruce A. Phillips, Erie, CO (US)

(73) Assignee: Qwest Communications International Inc., Denver, CO (US)

(*) Notice: Subject to any disclaimer, the term of this patent is extended or adjusted under 35 U.S.C. 154(b) by 1903 days.

This patent is subject to a terminal disclaimer.

(21) Appl. No.: 10/854,738

(22) Filed: May 25, 2004

(65) Prior Publication Data
US 2005/0030977 A1  Feb. 10, 2005

Related U.S. Application Data

(63) Continuation-in-part of application No. 10/676,418, filed on Sep. 30, 2003, now Pat. No. 7,194,249, which is a continuation-in-part of application No. 10/377,282, filed on Feb. 27, 2003, which is a continuation-in-part of application No. 10/356,364, filed on Jan. 31, 2003, now Pat. No. 7,180,988, and a continuation-in-part of application No. 10/356,688, filed on Jan. 31, 2003, and a continuation-in-part of application No. 10/356,338, filed on Jan. 31, 2003, and a continuation-in-part of application No. 10/367,596, filed on Feb. 14, 2003, and a continuation-in-part of application No. 10/367,597, filed on Feb. 14, 2003, (Continued)

(51) Int. Cl.
*H04L 12/28* (2006.01)
*H04L 12/56* (2006.01)

(52) U.S. Cl. .................................................... 370/401
(58) Field of Classification Search .............. 370/401, 370/252, 389, 392, 427, 410, 466, 524, 331, 370/338, 493, 465, 485, 356, 351–353; 709/246, 709/231, 205–207, 230, 200; 725/32, 108, 725/80, 133, 141, 74; 379/267, 88.17, 90.01, 379/93.01, 372, 373, 207; 340/573.1, 506, 340/539, 502, 531, 601, 7; 455/456.1, 404, 455/556.2, 466, 186, 458, 567, 414; 726/22
See application file for complete search history.

(56) References Cited

U.S. PATENT DOCUMENTS
4,775,997 A   10/1988   West, Jr. et al.
(Continued)

OTHER PUBLICATIONS

Document entitled, "Notice Regarding FCC Certification of EAS Decoder", Sep. 19, 2002, No. DA-02-2312, from website www.fcc.gov/eb/Public_Notices/DA-02-2312A1.html.

(Continued)

*Primary Examiner* — Hassan Phillips
*Assistant Examiner* — Prenell Jones

(57) ABSTRACT

Embodiments of the invention provide systems and methods for distributing urgent public information. Merely by way of example, urgent public information, such as an alert message, may be received by, inter alia, an alert gateway device. The alert message may then be distributed to a subscriber in any of a variety of ways, including by telephone, by data message (e.g., to a computer), by video message (e.g., via a television), by display on an alert notification device. In some embodiments, the alert gateway device may process the alert message and/or may determine how to provide the alert message to the subscriber.

33 Claims, 10 Drawing Sheets

Related U.S. Application Data said application No. 10/854,738 is a continuation-in-part of application No. 10/676,418, which is a continuation-in-part of application No. 10/377,290, filed on Feb. 27, 2003, which is a continuation-in-part of application No. 10/356,364, and a continuation-in-part of application No. 10/356,688, and a continuation-in-part of application No. 10/356,338, and a continuation-in-part of application No. 10/367,596, and a continuation-in-part of application No. 10/367,597, said application No. 10/854,738 is a continuation-in-part of application No. 10/676,418, which is a continuation-in-part of application No. 10/377,283, filed on Feb. 27, 2003, which is a continuation-in-part of application No. 10/356,364, and a continuation-in-part of application No. 10/356,688, and a continuation-in-part of application No. 10/356,338, and a continuation-in-part of application No. 10/367,596, and a continuation-in-part of application No. 10/367,597, said application No. 10/854,738 is a continuation-in-part of application No. 10/676,418, which is a continuation-in-part of application No. 10/377,584, filed on Feb. 27, 2003, now Pat. No. 7,187,418, which is a continuation-in-part of application No. 10/356,364, and a continuation-in-part of application No. 10/356,688, and a continuation-in-part of application No. 10/356,338, and a continuation-in-part of application No. 10/367,596, and a continuation-in-part of application No. 10/367,597, said application No. 10/854,738 is a continuation-in-part of application No. 10/676,418, which is a continuation-in-part of application No. 10/377,281, filed on Feb. 27, 2003, which is a continuation-in-part of application No. 10/356,364, and a continuation-in-part of application No. 10/356,688, and a continuation-in-part of application No. 10/356,338, and a continuation-in-part of application No. 10/367,596, and a continuation-in-part of application No. 10/367,597, said application No. 10/854,738 is a continuation-in-part of application No. 10/676,418, which is a continuation-in-part of application No. 10/444,941, filed on May 22, 2003, which is a continuation-in-part of application No. 10/356,364, and a continuation-in-part of application No. 10/356,688, and a continuation-in-part of application No. 10/356,338, and a continuation-in-part of application No. 10/367,597, said application No. 10/854,738 is a continuation-in-part of application No. 10/676,418, which is a continuation-in-part of application No. 10/448,249, filed on May 29, 2003, which is a continuation-in-part of application No. 10/356,364, and a continuation-in-part of application No. 10/356,688, and a continuation-in-part of application No. 10/356,338, and a continuation-in-part of application No. 10/367,596, and a continuation-in-part of application No. 10/367,597, said application No. 10/854,738 is a continuation-in-part of application No. 10/676,418, which is a continuation-in-part of application No. 10/624,454, filed on Jul. 21, 2003, and application No. 10/624,454, which is a continuation-in-part of application No. 10/367,597, and a continuation-in-part of application No. 10/444,941.

U.S. PATENT DOCUMENTS

| Patent No. | | Date | Inventor | Class |
|---|---|---|---|---|
| 4,989,230 | A | 1/1991 | Gillig et al. | |
| 5,202,765 | A | 4/1993 | Lineberry | |
| 5,526,403 | A | 6/1996 | Tam | |
| 5,668,862 | A * | 9/1997 | Bannister et al. | 379/207.14 |
| 5,673,692 | A | 10/1997 | Schulze et al. | |
| 5,740,075 | A | 4/1998 | Bigham et al. | |
| 5,771,465 | A | 6/1998 | Bojeryd | |
| 5,784,683 | A | 7/1998 | Sistanizadeh et al. | |
| 5,923,379 | A | 7/1999 | Patterson | |
| 5,971,921 | A | 10/1999 | Timbel | |
| 5,983,068 | A | 11/1999 | Tomich et al. | |
| 6,134,320 | A * | 10/2000 | Swan et al. | 379/372 |
| 6,209,025 | B1 | 3/2001 | Bellamy | |
| 6,226,379 | B1 * | 5/2001 | Swan et al. | 379/373.02 |
| 6,282,189 | B1 | 8/2001 | Eames | |
| 6,426,950 | B1 * | 7/2002 | Mistry | 370/352 |
| 6,443,890 | B1 | 9/2002 | Schulze et al. | |
| 6,463,273 | B1 * | 10/2002 | Day | 455/404.1 |
| 6,505,123 | B1 | 1/2003 | Root et al. | |
| 6,526,581 | B1 * | 2/2003 | Edson | 725/74 |
| 6,544,174 | B2 | 4/2003 | West et al. | |
| 6,731,942 | B1 * | 5/2004 | Nageli | 455/458 |
| 6,745,021 | B1 * | 6/2004 | Stevens | 455/404.1 |
| 6,807,564 | B1 | 10/2004 | Zeliner et al. | |
| 6,816,878 | B1 * | 11/2004 | Zimmers et al. | 709/200 |
| 6,842,628 | B1 * | 1/2005 | Arnold et al. | 455/556.2 |
| 6,909,903 | B2 * | 6/2005 | Wang | 455/456.1 |
| 6,990,591 | B1 * | 1/2006 | Pearson | 726/22 |
| 7,194,249 | B2 | 3/2007 | Phillips | |
| 7,233,781 | B2 * | 6/2007 | Hunter et al. | 455/404.1 |
| 7,250,846 | B2 * | 7/2007 | Ebling et al. | 340/7.28 |
| 7,264,590 | B2 | 9/2007 | Casey | |
| 7,283,045 | B1 * | 10/2007 | Manz | 340/506 |
| 7,389,104 | B2 | 6/2008 | Phillips | |
| 7,631,047 | B1 * | 12/2009 | Adamczyk et al. | 709/207 |
| 2001/0028642 | A1 * | 10/2001 | Veschi | 370/352 |
| 2002/0122136 | A1 | 9/2002 | Safadi et al. | |
| 2002/0171552 | A1 * | 11/2002 | Tate | 340/573.1 |
| 2003/0026416 | A1 | 2/2003 | Fusco | |
| 2003/0069002 | A1 * | 4/2003 | Hunter et al. | 455/404 |
| 2003/0072330 | A1 * | 4/2003 | Yang et al. | 370/493 |
| 2003/0131142 | A1 | 7/2003 | Horvitz et al. | |
| 2003/0226143 | A1 * | 12/2003 | Michael et al. | 725/32 |
| 2004/0049785 | A1 | 3/2004 | Grzeczkowski et al. | |
| 2004/0150518 | A1 | 8/2004 | Phillips et al. | |
| 2004/0150748 | A1 | 8/2004 | Phillips et al. | |
| 2004/0150749 | A1 | 8/2004 | Phillips et al. | |
| 2004/0150750 | A1 | 8/2004 | Phillips et al. | |
| 2004/0150751 | A1 | 8/2004 | Phillips et al. | |
| 2004/0151161 | A1 | 8/2004 | Casey et al. | |
| 2004/0151168 | A1 | 8/2004 | Phillips et al. | |
| 2004/0151289 | A1 | 8/2004 | Phillips et al. | |
| 2004/0151290 | A1 | 8/2004 | Magarasevic et al. | |
| 2004/0152493 | A1 | 8/2004 | Phillips et al. | |
| 2004/0153289 | A1 | 8/2004 | Casey et al. | |
| 2004/0153577 | A1 | 8/2004 | Phillips et al. | |
| 2004/0153670 | A1 | 8/2004 | Casey et al. | |
| 2004/0160460 | A1 | 8/2004 | Casey et al. | |
| 2004/0163125 | A1 | 8/2004 | Phillips et al. | |
| 2004/0163126 | A1 | 8/2004 | Phillips et al. | |
| 2004/0163128 | A1 | 8/2004 | Phillips et al. | |
| 2004/0168199 | A1 | 8/2004 | Phillips et al. | |
| 2004/0172657 | A1 | 9/2004 | Phillips et al. | |
| 2004/0176085 | A1 | 9/2004 | Phillips et al. | |
| 2004/0177163 | A1 | 9/2004 | Casey et al. | |
| 2004/0223605 | A1 * | 11/2004 | Donnelly | 379/373.01 |
| 2004/0258049 | A1 * | 12/2004 | Sylvain et al. | 370/352 |
| 2004/0264687 | A1 | 12/2004 | Casey et al. | |
| 2005/0018653 | A1 | 1/2005 | Phillips et al. | |
| 2005/0022007 | A1 | 1/2005 | Phillips et al. | |
| 2006/0020992 | A1 * | 1/2006 | Pugel et al. | 725/108 |
| 2006/0031582 | A1 * | 2/2006 | Pugel et al. | 709/246 |

OTHER PUBLICATIONS

Emergency Alert System Procedures, 2001 Cable Handbook, 2001, pp. 1-31, FCC, U.S.A.

FCC News Release entitled, "FCC Amends Emergency Alert System Rules, Includes Child Abduction Alerts", Feb. 26, 2002, from website www.fcc.gov/eb/News_Releases/DOC-220252A1.html.

Federal Communications Commission Fact Sheet entitled, "The Emergency Alert System (EAS)", from website www.fcc.gov/eb/easfact.html.

Frank, Edward and Holloway, Jack; "Connecting the Home with a Phone Line Network Chip Set", IEEE Micro, Mar.-Apr. 2000, pp. 2-14.

U.S. Appl. No. 10/676,418, Office Action dated Feb. 23, 2006, 16 pages.

U.S. Appl. No. 10/676,418, Final Rejection dated Aug. 9, 2006, 14 pages.

U.S. Appl. No. 10/676,418, Notice of Allowance dated Oct. 19, 2006, 12 pages.

U.S. Appl. No. 11/670,923, Office Action dated Sep. 4, 2007, 4 pages.

U.S. Appl. No. 11/670,923, Notice of Allowance dated Feb. 7, 2008, 12 pages.

U.S. Appl. No. 10/445,275, Office Action dated Aug. 25, 2006, 9 pages.

U.S. Appl. No. 10/445,275, Office Action dated May 1, 2007, 4 pages.

U.S. Appl. No. 10/445,275, Notice of Allowance dated Jul. 12, 2007, 6 pages.

U.S. Appl. No. 10/676,429, Office Action dated Mar. 17, 2008, 24 pages.

U.S. Appl. No. 10/676,429, Final Rejection dated Sep. 26, 2008, 22 pages.

U.S. Appl. No. 10/676,429, Office Action dated Mar. 5, 2009, 43 pages.

U.S. Appl. No. 10/676,429, Final Rejection dated Jun. 9, 2009, 35 pages.

U.S. Appl. No. 10/676,429, Advisory Action dated Aug. 11, 2009, 3 pages.

U.S. Appl. No. 10/676,429, Office Action dated Oct. 14, 2009, 34 pages.

U.S. Appl. No. 10/676,429, Final Rejection dated Apr. 13, 2010, 34 pages.

U.S. Appl. No. 10/676,429, Advisory Action dated Jul. 2, 2010, 3 pages.

U.S. Appl. No. 10/676,429, Office Action dated Sep. 28, 2010, 29 pages.

U.S. Appl. No. 11/670,923, Issue Notification dated May 28, 2008, 1 page.

U.S. Appl. No. 10/676,429, Final Office Action dated Mar. 3, 2011, 33 pages.

* cited by examiner

ALERT GATEWAY, SYSTEMS AND METHODS

CROSS REFERENCES TO RELATED APPLICATIONS

This application is a continuation-in-part of U.S. application Ser. No. 10/676,418 filed Sep. 30, 2003 by Phillips et al. and entitled "METHODS, SYSTEMS AND APPARATUS FOR PROVIDING URGENT PUBLIC INFORMATION" (the "'418 Application"), the entire disclosure of which is incorporated herein by reference.

The '418 Application is a continuation-in-part of U.S. application Ser. No. 10/377,282, filed Feb. 27, 2003 by Casey et al. and entitled "SYSTEMS AND METHODS FOR DISPLAYING DATA OVER VIDEO" (the "'282 Application"), which is a continuation-in-part of U.S. application Ser. No. 10/356,364, filed Jan. 31, 2003 by Phillips et al. and entitled "PACKET NETWORK INTERFACE DEVICE AND SYSTEMS AND METHODS FOR ITS USE" (the "'364 Application"); a continuation-in-part of U.S. application Ser. No. 10/356,688, filed Jan. 31, 2003 by Phillips et al. and entitled "SYSTEMS, METHODS AND APPARATUS FOR PROVIDING A PLURALITY OF TELECOMMUNICATIONS SERVICES" (the "'688 Application"); a continuation-in-part of U.S. application Ser. No. 10/356,338, filed Jan. 31, 2003 by Phillips et al. and entitled "CONFIGURABLE NETWORK INTERFACE DEVICE AND SYSTEMS AND METHODS FOR ITS USE" (the "'338 Application"); a continuation-in-part of U.S. application Ser. No. 10/367,596, filed Feb. 14, 2003 by Casey et al. and entitled "SYSTEMS AND METHODS FOR DELIVERING A DATA STREAM TO A VIDEO APPLIANCE" (the "'596 Application"); and a continuation-in-part of U.S. application Ser. No. 10/367,597, filed Feb. 14, 2003 by Casey et al. and entitled "SYSTEMS AND METHODS FOR PROVIDING APPLICATION SERVICES" (the "'597 Application"), of which the entire disclosures of all are incorporated herein by reference for all purposes.

The '418 is also a continuation-in-part of U.S. application Ser. No. 10/377,290, filed Feb. 27, 2003 by Phillips et al. and entitled SYSTEMS AND METHODS FOR FORMING PICTURE-IN-PICTURE SIGNALS" (the "'290 Application"), the entire disclosure of which is incorporated herein by reference for all purposes, which is a continuation-in-part of the '364 Application, a continuation-in-part of the '688 Application, a continuation in part of the '338 Application, a continuation-in-part of the '596 Application, and a continuation-in-part of the '597 Application.

The '418 Application is also a continuation-in-part of U.S. application Ser. No. 10/377,283 filed Feb. 27, 2003 by Phillips et al. and entitled "SYSTEMS AND METHODS FOR MONITORING VISUAL INFORMATION" (the "'283 Application"), the entire disclosure of which is incorporated herein by reference for all purposes, which is a continuation-in-part of the '364 Application, a continuation-in-part of the '688 Application, a continuation in part of the '338 Application, a continuation-in-part of the '596 Application, and a continuation-in-part of the '597 Application.

The '418 Application is also a continuation-in-part of U.S. application Ser. No. 10/377,584 filed Feb. 27, 2003 by Phillips et al. and entitled "SYSTEMS AND METHODS FOR DELIVERING PICTURE-IN-PICTURE SIGNALS AT DIVERSE COMPRESSIONS AND BANDWIDTHS" (the "'584 Application"), the entire disclosure of which is incorporated herein by reference for all purposes, which is a continuation-in-part of the '364 Application, a continuation-in-part of the '688 Application, a continuation in part of the '338 Application, a continuation-in-part of the '596 Application, and a continuation-in-part of the '597 Application.

The '418 Application is also a continuation-in-part of U.S. application Ser. No. 10/377,281 filed Feb. 27, 2003 by Phillips et al. and entitled "SYSTEMS AND METHODS FOR PROVIDING AND DISPLAYING PICTURE-IN-PICTURE SIGNALS," (the "'281 Application"),the entire disclosure of which is incorporated herein by reference for all purposes, which is a continuation-in-part of the '364 Application, a continuation-in-part of the '688 Application, a continuation in part of the '338 Application, a continuation-in-part of the '596 Application, and a continuation-in-part of the '597 Application.

The '418 Application is also a continuation-in-part of U.S. application Ser. No. 10/444,941, filed May 22, 2003 by Phillips et al. and entitled "SYSTEMS AND METHODS FOR PROVIDING TELEVISION SIGNALS USING A NETWORK INTERFACE DEVICE," (the "'941 Application"), the entire disclosure of which is incorporated herein by reference for all purposes, which is a continuation-in-part of the '364 Application, a continuation-in-part of the '688 Application, a continuation in part of the '338 Application, and a continuation-in-part of the '597 Application.

The '418 Application is also a continuation-in-part of U.S. application Ser. No. 10/448,249, filed May 29, 2003 by Phillips et al. and entitled "METHODS AND APPARATUS FOR DELIVERING A COMPUTER DATA STREAM TO A VIDEO APPLIANCE WITH A NETWORK INTERFACE DEVICE," (the "'249 Application") the entire disclosure of which is incorporated herein by reference for all purposes, which is a continuation-in-part of the '364 Application, a continuation-in-part of the '688 Application, a continuation in part of the '338 Application, a continuation-in-part of the '596 Application, and a continuation-in-part of the '597 Application.

The '418 Application is also a continuation-in-part of U.S. application Ser. No. 10/624,454, filed Jul. 21, 2003 by Casey et al. and entitled "SYSTEMS AND METHODS FOR INTEGRATING MICROSERVERS WITH A NETWORK INTERFACE DEVICE," the entire disclosure of which is incorporated herein by reference for all purposes, which is a continuation-in-part of the '597 Application and a continuation in part of the '941 Application.

This application is related to U.S. application Ser. No. 10/676,429, filed Sep. 30, 2003 by Phillips et al. and entitled "METHODS, SYSTEMS AND APPARATUS FOR SELECTIVELY DISTRIBUTING URGENT PUBLIC INFORMATION," the entire disclosure of which is incorporated herein by reference for all purposes.

BACKGROUND OF THE INVENTION

This application relates generally to the provision of urgent public information, and specifically to methods and systems for distributing urgent public information.

Often, urgent public information is of a critical nature, such that it would be beneficial to have some reliable means to make reasonably sure that the information reaches the intended audience it should be disseminated to the interested segment of the population. As well, urgent public information, by its nature, sometimes is time-sensitive, such that it is desirable the information be disseminated to the interested population as expeditiously as possible.

Existing alert distribution systems generally rely on a blanket method of distribution, using broadcast media (e.g., television and radio stations) to inform the public of urgent information. Such distribution systems are overbroad, in that each person watching television or listening to the radio in a given broadcast area is subjected to repeated broadcast of the information whether or not it even applies to or is of interest to that person. The systems are also underinclusive, however, in that certain people, to whom the alerts may be of vital interest, likely will not receive the alert if they are not either watching television or listening to the radio.

There is a need for new distribution systems and devices that allows for more timely and/or selective distribution of urgent public information to those to whom the information likely would be of interest.

BRIEF SUMMARY OF THE INVENTION

Embodiments of the invention provide systems and methods for distributing urgent public information. Merely by way of example, urgent public information, such as an alert message, may be received by, inter alia, an alert gateway device. The alert message may then be distributed to a subscriber in any of a variety of ways, including by telephone, by data message (e.g., to a computer), by video message (e.g., via a television), by display on an alert notification device. In some embodiments, the alert gateway device may process the alert message and/or may determine how to provide the alert message to the subscriber.

Merely by way of example, one set of embodiments provides alert gateway devices, which may be used for receiving an alert at a subscriber location and/or providing the alert to a subscriber. In some embodiments, the alert gateway device may comprise a network interface device, may incorporate a network interface device, and/or may be in communication with a network interface device. The alert gateway device may be mobile and/or may include a means for determining the location of the alert gateway device.

An alert gateway device in accordance with certain embodiments may comprise one or more external interfaces, which may be configured to communicate with at least one alert source. The alert gateway device may also comprise one or more internal interfaces, a processor in communication with the external interface(s) and internal interface(s) and/or a storage medium in communication with the processor. In some embodiments, the storage medium may comprise instructions executable by the processor to receive an alert message, which can comprise an alert, via the external interface(s). The instructions may be further executable to interpret the alert message, determine how to provide the alert to the subscriber, format the alert in such a way to facilitate the provision of the alert in a determined manner and/or, using the internal interface, provide the alert to the subscriber, perhaps according to the determination of how to provide the alert to the subscriber.

In accordance with some embodiments, the alert message (and/or the alert) may comprise urgent public information, which can include, inter alia, an Emergency Alert System transmission, an Amber Alert, a severe weather notification, and and/or Homeland Security Advisory notification. In some cases, the alert message may also comprise alert information comprising information about the alert; in particular cases, the information about the alert may be incorporated within the alert and/or additional to the alert. Determining how to provide the alert can comprise determining whether the alert applies to the subscriber, and/or determining whether the alert applies to the subscriber can comprise evaluating information about the alert. In other cases, determining how to provide the alert to the subscriber can comprise determining a location of the subscriber and/or determining the urgency of the alert. Providing the alert to the subscriber, then, may comprise transmitting the alert to a subscriber device near the location of the subscriber. In still other cases, determining how to provide the alert to the subscriber may comprise determining whether a particular subscriber device is currently in use. If the gateway determines that a particular subscriber device currently is in use, providing the alert to the subscriber may comprise transmitting the alert for reception by the particular subscriber device.

In some embodiments, formatting the alert can comprise converting the alert among various formats. Merely by way of example, formatting the alert can comprise converting the alert to an audible format, perhaps a digital audio file, an analog audio stream and/or voice signals (such as, for example, those receivable by a standard telephone). In other cases, formatting the alert can comprise converting the alert to a visual format, such as a digital video file and/or an analog digital stream. The visual format may include textual information, and/or converting the alert may comprise extracting closed-captioning information, converting a speech portion of the alert to text, etc. The textual information may include formatting, and/or the textual information may comprise a file, such as an XML file or the like.

In other embodiments, the alert may be encoded, and/or formatting the alert may comprise decoding the alert. Merely by way of example, the alert may be encoded with event and/or location information (which, for example, might conform to the Emergency Alert System standards), and/or interpreting the alert message may comprise interpreting this event and/or location information. According to particular embodiments, formatting the alert can comprise removing data (such as, merely by way of example, alert information) from the alert message and/or adding data (such as, again merely by way of example, data about an origination of the alert, a transmission time of the alert, and/or an expiration time of the alert).

In some implementations, one or more of the internal interface(s) of the alert gateway device may comprise a display, and/or providing the alert to the subscriber may comprise displaying the alert on the display. The display may be integrated with the alert gateway device. In other implementations, one or more of the internal interface(s) may be in communication with one or more subscriber device(s), and/or providing the alert to the subscriber may comprise transmitting the alert via one or more of the internal interface(s), for reception by the subscriber device(s). The subscriber devices can be any of a variety of devices, including without limitation, an alert notification device, a display device (e.g., a television, monitor, etc.) and/or the like. In particular embodiments a subscriber device may comprise a telephone (e.g., a POTS telephone, a wireless telephone, a SIP telephone, etc.), and/or providing the alert to the subscriber can comprise sending a ring signal to the telephone, allowing the subscriber to answer the telephone, and/or transmitting the alert via the telephone. Alternatively, providing the alert can comprise dialing a telephone number associated with the telephone, allowing the subscriber to answer the telephone and transmitting the alert via the telephone. In some cases (e.g., where a subscriber device is a computer), providing the alert may comprise transmitting an email message for the subscriber, preparing a web page (which may comprise the alert) for the subscriber, and/or transmitting data to a software application (which may be configured to display the alert on a computer display) running on the computer.

Some embodiments of the alert gateway device may be configured to anticipate a. confirmation message indicating that the subscriber received the alert and/or to transmit a failure notification via the external interface; the failure notification may indicate that the subscriber did not receive the alert. Alternatively, the alert gateway device may be configured to provide the alert to the subscriber a second time if no confirmation message is received by the alert gateway device within a certain period. In some cases, the alert gateway may make a second determination of how to provide the alert to the subscriber; the original determination may comprise a determination that the alert should be transmitted to a first subscriber device, and the second determination may comprise a determination that the alert should be transmitted to a second subscriber device.

The alert gateway device may be configured to allow the subscriber to provide preferences that determine, with respect to a given alert, how the alert should be provided to the subscriber. Moreover, the subscriber may be a plurality of subscribers, and providing the alert may comprise taking at least one specific action for each subscriber with respect to the alert.

An alert gateway device in accordance with other embodiments of the invention may, in a relationship between a subscriber and at least one alert provider, be used for providing an alert to a subscriber. The alert gateway device may in communication with a communication network, and/or the alert gateway device may include a first, external interface, a second, internal interface and/or at least one processor. The alert gateway device may be configured to receive an alert message from the alert provider (e.g. via the first interface). The alert message may comprise an alert and/or associated alert information, and the alert gateway device may be further configured to process the alert (e.g., to determine how the alert should be handled) and/or take at least one specific action with respect to the alert (perhaps based on the determination of how the alert should be handled). The alert gateway device may be configured to allow the subscriber to provide preferences that determine, with respect to a given alert, the at least one specific action that should be taken. Alternatively and/or in addition, the subscriber may be a plurality of subscribers, and taking at least one specific action with respect to the alert may comprise taking at least one specific action for each subscriber with respect to the alert.

In some cases, processing the alert may comprise determining that the alert does not apply to the subscriber, and taking at least one specific action with respect to the alert can comprise ignoring the alert. In other cases, processing the alert comprises determining whether the alert is valid, evaluating the alert information to determine the nature of the alert, and/or converting the alert from a first format to a second format. The alert provider may comprise a plurality of alert providers, and/or processing the alert may comprise determining from which of the plurality of alert providers the alert message was received.

The second interface may be in communication with a subscriber device, and processing the alert may comprise determining that the subscriber should receive the alert. Taking at least one specific action with respect to the alert, therefore, may comprise transmitting the alert via the second interface for reception by the subscriber device, such that the alert may be provided to the subscriber by the subscriber device. Alternatively and/or in addition, an alert gateway device may further comprise alert means for providing an alert directly to a user, and/or taking at least one specific action with respect to the alert may comprise notifying the subscriber about the alert via the alert means. The alert means may be incorporated within the second interface.

In some cases, taking at least one specific action can comprise anticipating an acknowledgement that the subscriber received the alert and/or, if an acknowledgment is received by at least one of the plurality of subscriber devices, transmitting a message to retract the alert from the other subscriber devices. Conversely, if no acknowledgment is received within a certain period, the alert may be retransmitted (perhaps for reception by a different subscriber device), and/or a notification that the alert was not received by the subscriber may be transmitted for reception by the alert provider. In other cases, the at least one specific action may comprise transmitting a retraction message for reception by the at least one subscriber device; the retraction message can signify that the alert no longer needs to be provided to the subscriber.

Another set of embodiments provides methods of providing an alert to a subscriber. Some of these methods may include the use of an alert gateway device, as described herein, while others need not. A method in accordance with some embodiments may comprise receiving an alert message (which may comprise an alert) and/or providing the alert to a subscriber. In some cases, an alert gateway may be provided at a subscriber premises and/or may be configured to receive an alert message. The method may, in various embodiments, include interpreting the alert message and/or determining how to provide the alert to the subscriber. The alert may also be formatted to facilitate the provision of the alert (perhaps according to the determination of how to provide the alert to the subscriber), and/or the alert may be provided to the subscriber according to the determination of how to provide the alert to the subscriber.

A method in accordance with further embodiments may comprise a providing an alert gateway device in communication with a communication network. The alert gateway device can include a first, external interface, a second, internal interface and/or at least one processor. The method may further comprise receiving via the first interface an alert message comprising an alert and associated alert information, processing the alert to determine how the alert should be handled, and/or based on the determination of how the alert should be handled, taking at least one specific action with respect to the alert.

Yet another set of embodiments provides systems for providing alerts to a subscriber. A system in accordance with some of these embodiments may comprise at least one communication medium, at least one subscriber device (which may be in communication with the at least one communication medium and/or may be configured to receive an alert and provide the alert to the subscriber), and/or an alert gateway, which may be located at a subscriber premises. The alert gateway may be similar to those described herein and/or may comprise at least one external interface and/or at least one internal interface. The at least one internal interface might be in communication with the at least one communication medium. The alert gateway may be configured to receive an alert message (perhaps comprising an alert) via the at least one external interface, interpret the alert message, and/or transmit the alert via the at least one internal interface. In this way, the alert may be received by the at least one subscriber device and provided to the subscriber.

The at least one subscriber device may be a plurality of subscriber devices, the at least one communication medium may be a plurality of communication media, and/or the at least one internal interface may be a plurality of internal interfaces. Each of the plurality of internal interfaces may be in communication with one (or more) of the plurality of communication media, and each of the plurality of subscriber devices may be in communication with one (or more) of the plurality of communication media. The alert gateway device may be configured to determine which of the plurality of subscriber devices should receive the alert.

A system in accordance with other embodiments may comprise an alert gateway device in communication with a communication network. The alert gateway device may include a first, external interface, a second, internal interface and/or at least one processor, and the alert gateway device may be configured to receive an alert (and/or an alert message) from the alert provider via the first interface, process the alert to determine how the alert should be handled, and/or based on the determination of how the alert should be handled, take at least one specific action with respect to the alert. The system may further include at least one communication medium in communication with the second interface and/or at least one subscriber device in communication with the alert gateway device via the communication medium. The at least one subscriber device may be configured to receive an alert from the alert gateway and notify the subscriber about the alert.

The at least one subscriber device may be a plurality of subscriber devices, and/or processing the alert may comprise determining a subset of the plurality of subscriber devices that should receive the alert; taking at least one specific action with respect to the alert may comprise transmitting the alert for reception to the subset of the plurality of subscriber devices that should receive the alert. The at least one subscriber device may be configured to transmit an acknowledgement for reception by the alert gateway device that that the alert was received by the subscriber and/or to accept a notification from the subscriber that the subscriber received the alert; the at least one subscriber device may be further configured not to transmit the acknowledgment until receiving the notification from the subscriber.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
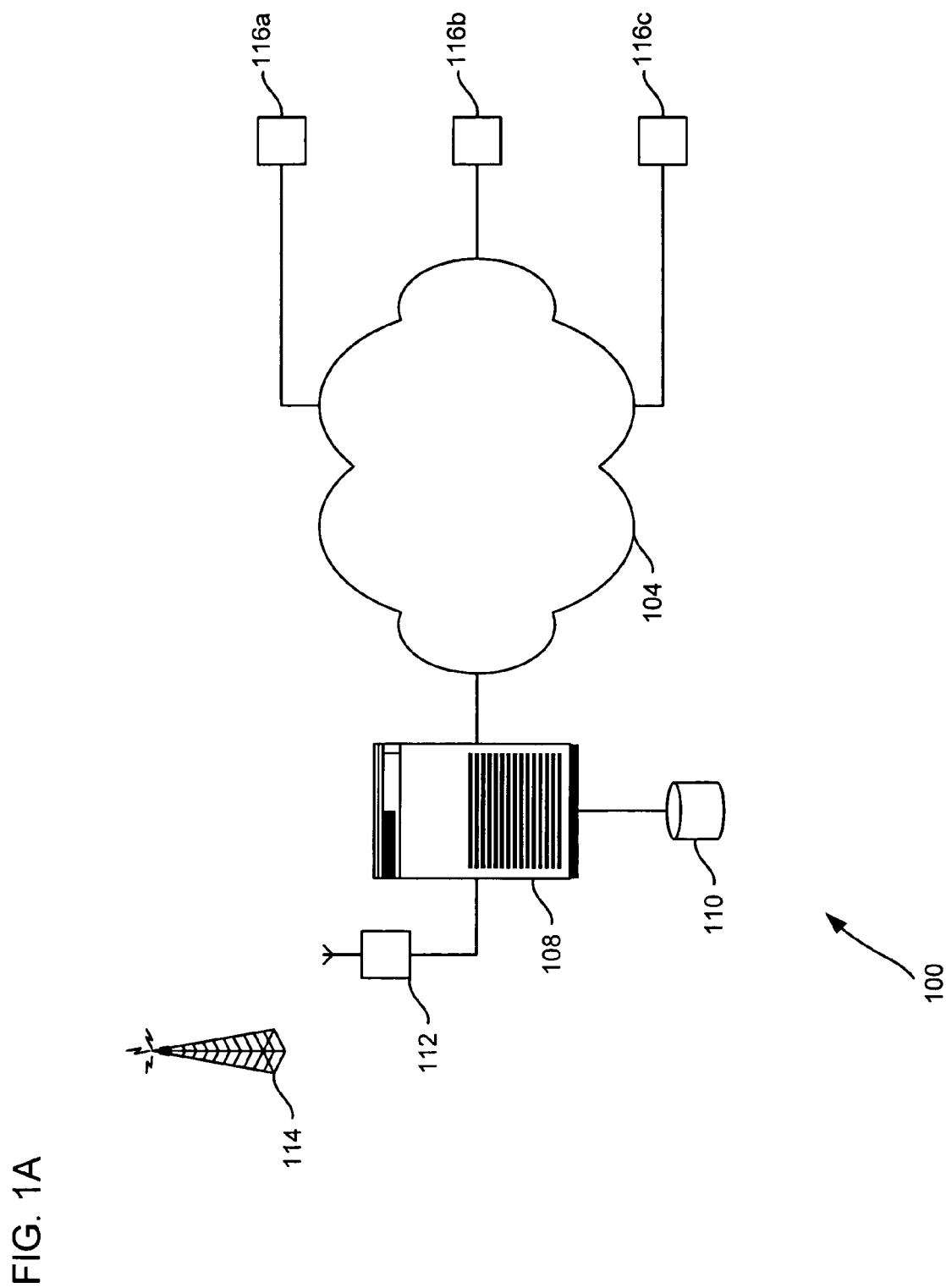
FIG. 1A illustrates a system that can be used to provide public information to a plurality of subscribers, in accordance with various embodiments of the invention.

Various detailed embodiments of the present invention are disclosed herein; it should be understood, however, that the disclosed embodiments are merely exemplary of the invention, which may be embodied in various forms. Therefore, specific structural and functional details disclosed herein should not be interpreted as limiting, but merely as a representative basis for teaching one skilled in the art variously to employ the present invention in virtually any appropriately detailed structure.

Embodiments of the invention provide, among other things, devices, systems and methods for distributing urgent public information. Urgent public information, as the term is used herein, should be understood to mean information that is of relatively immediate interest to at least some segment of the general population. Examples of urgent public information therefore can include, inter alia, alerts promulgated by and/or in accordance with the Emergency Alert System, Amber Alerts and Homeland Security Advisories. Further examples can include weather information, for instance alerts from the National Weather Service, traffic information, and the like.

The term "alert" is sometimes used herein to denote information (e.g., urgent public information) that can be distributed according to embodiments of the invention. An alert can comprise textual information, audible information (including, e.g., speech, alert tones and the like), visual information (including, e.g., maps, photos, video signals and the like), and any other data or signals useful to convey urgent public information to a subscriber. An alert can be thought of as part of an "alert message," which can comprise merely the alert itself and/or can include additional data, including for example alert information. The term "alert information" should be understood to mean information pertaining to the alert (e.g., metadata) that can be analyzed to determine whether and/or to whom the alert pertains and/or should be distributed. Alert information can include, but is not limited to, information about the geographic scope of the alert, when the alert was issued and/or when the alert expires, the type of alert (e.g., weather, Homeland Security, Amber Alert, etc.), and any other information that describes an alert and/or could be helpful in determining whether an alert should be distributed to a particular user. In some cases, alert information can be intrinsic to the alert. For example, a weather alert may be a single plaintext message, that includes, within the text of the alert, the time the alert was issued and/or the time the alert will expire. In such cases, embodiments of the invention can extract such alert information from the alert itself, and use the alert information to, inter alia, determine to which distribution address(es) the alert should be sent.

In other cases, however, alert information can be maintained separate from the substance of the alert. Merely by way of example, an alert may be transmitted as a formatted and/or tagged message (e.g., an XML message, etc.), such that the alert comprises one or more tagged fields within the message, and additional alert information is included in the message using one or more differently tagged fields. Thus, an alert message may include a field specifying an "alert initiation time" that signifies when the alert was first issued, as well as an "alert expiration time" that signifies when the alert will expire, such as in the case of weather alerts, for example. An alert message can have other fields of alert information as well, including for example, fields relating to the geographic scope of the alert, etc. Embodiments of the invention, therefore can parse an alert message.

Certain embodiments of the invention provide systems for distributing urgent public information to applicable subscribers. For ease of description, the term "subscriber" is used to refer to any entity that is capable of receiving urgent public information, and the term "provider" is used to refer to an entity that distributes urgent public information. In light of the entire disclosure, however, those skilled in the art will appreciate, that the use of these terms should not be interpreted to limit the scope of the invention to a particular relationship between a provider and a subscriber. In some cases, a provider can be the ultimate source of the urgent public information to be distributed; in other cases, the provider may function to receive an alert from another source (which might be a governmental agency such as the National Weather Service or the like) and distribute that information to subscribers. Likewise, a subscriber may the ultimate recipient of the alert and/or may also be a provider capable of distributing the alert to other subscribers. In particular embodiments, a provider can be a telecommunication service provider, and a subscriber can be a person, business or the like that receives telecommunication services from the provider.

FIG. 1A illustrates one exemplary system 100 that can be used to distribute urgent public information. The system 100 includes a communication network 104, which can be any of several different types of communication networks. Merely by way of example, the network 104 can be the Internet. In other embodiments, the network 104 can be a telecommunication provider's network, including for example, an asynchronous transfer mode ("ATM") network, a time-division multiplexed ("TDM") network, a wireless network (including, for instance, cellular networks, personal communication service ("PCS") networks, 802.11 networks, and the like), and/or a cable television distribution network. In many cases, the network 104 can be a composite of a plurality of these (and other) types of networks. In short, the network 104 can be any public or private network capable of transporting alert information as described herein. In some cases, the network 104 will be capable of transmitting packeted data, for instance, data formatted according to the TCP/IP suite of protocols. Based on the disclosure herein, those skilled in the art will understand that the network 104 may feature a plurality of routes, or paths, from one point (or device) to another.

The network 104 can be in communication with an alert distribution device 108, which, in accordance with some embodiments, functions to receive alerts and distribute those alerts to appropriate subscribers. In some cases, the alert distribution device 108 can be a general-purpose server computer running one (or more) of a variety of server operating systems known in the art, including for example, Microsoft™ Windows™ (NT, 2000, XP or the like) or any of the UNIX™ or UNIX™-like operating systems (including Linux™, Solaris™, AIX™ and the like), as well, perhaps, as specialized software for providing the services discussed herein. Those skilled in the art will recognize, based on the disclosure herein, that other operating systems may be used as well, so long as they are capable of supporting the software used to perform the functions hereafter described. Those skilled in the art, therefore, will recognized based on the disclosure herein that he alert distribution device 108 can one or more processors that can execute instructions to perform many of the processing functions described herein. In many cases, the instructions can be software instructions stored on a storage medium such as those described below. In other cases, the alert distribution device 108 can comprise dedicated hardware for distributing urgent public information, such that some (or all) of the functionality of the alert distribution device 108 is embodied in hardware or firmware (for instance, any of the varieties of ROM, PROM, EPROM, EEPROM and the like).

In many embodiments, the alert distribution device 108 will include a storage medium 110, which can be used to store both software instructions as well as operating data. Those skilled in the art will recognize that implementations of the storage medium 110 will vary in accordance with different embodiments: The medium 110 may be one ore more hard disk drives (including, for instance, a redundant array of inexpensive disks ("RAID") system) attached either internally or directly externally to the alert distribution device 108, as illustrated in FIG. 1A. In other cases, the storage medium 110 can be part of a storage area network and/or can be remote from the alert distribution device 108. The location of the storage medium 110 is immaterial to the scope of the invention, so long as the storage medium 110 can be accessed by the alert distribution device 108. Similarly, while for ease of description, the storage medium 110 is illustrated as a single device on FIG. 1A, the storage medium 110 can in fact be a plurality of storage media, situated at the same or different locations.

The storage medium 110 can comprise one or more databases, which can be used to store data and/or configuration settings for the system 100. In accordance with some embodiments, one database can be used to store a table of logical address information associated with the subscribers, while another database can be used to store demographic information, including without limitation physical address information, associated with the subscribers. Merely by way of example, a first database can be used to store IP address information for each subscriber. The IP address information can be static or dynamic; for instance, in accordance with some embodiments, as discussed in detail below, each subscriber can be assigned a logical address using a dynamic addressing scheme such as the dynamic host configuration protocol ("DHCP") known to those skilled in the art. Further, a second database can comprise information related to the physical address of the subscriber, such as a ZIP+4 code, street address, telephone number, GPS coordinates, and/or the like. In other embodiments, the system 100 can store a separate record of a physical hardware address (e.g., a MAC address, familiar to those skilled in the art) for each subscriber, such that each physical hardware address can be associated with a geographical location and/or a logical address. As described below, the system 100 can use these databases to determine, for a given alert message, which logical addresses should receive the alert message.

The alert distribution device 108 can also comprise (and/or be in communication with) an alert receiver 112, which can receive alerts. In some cases, as illustrated in FIG. 1A, the alert receiver 112 can be a discrete device having an independent connection with an alert source 114. In other cases, the functionality of the alert receiver 112 can be incorporated within the alert distribution device 108. In either case, the alert receiver 112 can be capable of receiving urgent public information from the alert source 114. In some instances, alert receiver 112 can include a wireless antenna capable of receiving RF signals from the alert source 114. Those skilled in the art will recognize, for instance, that the federal Emergency Alert System broadcasts alerts using a particular radio frequency; the alert receiver 112 can be tuned to receive these and other signals over the airwaves. In other cases, the alert receiver 112 can receive alert information from an alert source 114 via other transports, including, for example the network 104 or another, perhaps similar network. Although for ease of reference, only one alert source 114 is illustrated on FIG. 1A, the alert receiver 112 can be configured to receive urgent public information from a plurality of alert sources; in addition, the alert distribution device 108 can be in communication with (and/or incorporate) a plurality of alert receivers for receiving urgent public information from a variety of alert sources.

The alert source 114 can be any device and/or entity that transmits or otherwise provides urgent public information. As mentioned above, in some cases, the alert source 114 can be affiliated with a federal, state or local governmental authority and/or other public entity. In other cases, the alert source 114 can be privately owned and/or operated, perhaps on a commercial bases. In some such cases, public information distributed from the alert source can be associated with a subscription service, and systems in accordance with embodiments of the invention can accommodate and/or facilitate a subscription service related to the distribution of the information from the alert source 114.

The alert distribution device 108 can be in communication with a plurality of alert gateways 116a, 116b, 116c, which can be operable to receive urgent public information from the alert distribution device 108, for instance, via the network 104. In this way, the alert distribution device 108 can function to distribute information (such as data, video signals, voice signals and the like, including urgent public information) to one or more of the plurality of alert gateways 116a, 116b, 116c. The alert distribution device can include one or more interfaces for communicating with the alert gateways 116, the alert source 114 and other devices. Such interfaces can include, for instance, wireless receivers and/or transmitters, network interface cards (such as Ethernet cards, fiber optic interfaces, such as FDDI cards), modems, and the like. In some cases, an interface can provide communication between the alert distribution device 108 and the communication network 104. Thus, such interfaces can serve to receive and/or transmit alert messages as appropriate.

Those skilled in the art will appreciate that, in many cases, there may be multiple routes, or paths, through the network 104 between the alert distribution device 108 and the alert gateways 116. Thus, in accordance with some embodiments, the alert distribution device 108 can be configured to select from among multiple such paths. Merely by way of example, the alert distribution device 108 can be configured to transmit an alert to a particular alert gateway (e.g., 116a) via one path (perhaps via a first interface, which is in communication with a first network) and, if that transmission is unsuccessful, to retransmit the alert to via a second path (perhaps via a second interface, which is in communication with a second network). In this example, the first and second networks might both be data networks connected to a common network, such as the Internet, which is further in communication with the alert gateway 116a. Alternatively, the first and second networks might be different distribution networks; for example, the first network could be a cable distribution network, and the second network can be a public switched telephone network. Thus, if one of the networks is unavailable, the alert message can still be transmitted via another network. In other embodiments, the alert distribution device 108 can transmit via more than two paths.

In addition, in some embodiments, the network 104 can be distributed across large distances (indeed, in the case of the Internet, for instance, the network 104 can span the globe), and that the alert distribution device 108 may be located a significant physical distance from the alert receiver 112 and/or the alert source 114. For that matter, the alert distribution device can be physically distant (e.g., in a different locality, state or country) from each of the alert gateways 116, and one alert gateway 116a can be physically distant from another alert gateway 116b, such that an alert, for example, dealing with severe weather may be of interest to a subscriber associated with one alert gateway 116a located in the path of the severe weather but not a subscriber associated with another alert gateway 116b located elsewhere.

For this reason, among others, the alert distribution device 108 can be configured to select, based on the nature the information to be distributed and/or certain characteristics/preferences of the alert gateways 116 (and/or the subscribers associated with them), which of the alert gateways 116 appropriately should receive that information. Returning to the weather example, the alert distribution device 108 can be configured to route the severe weather alert only to the alert gateway 116a located in the path of the severe weather. As illustrated by this example and discussed in further detail below, the location of an alert gateway can be one characteristic used to determine whether the alert gateway should receive the information. As discussed below, however, many other characteristics may be used to determine whether a given set of information should be distributed to a particular alert gateway.

As alluded to above, an alert gateway 116 can store the preferences of a subscriber, referred to herein sometimes as "subscriber preferences." These preferences can be administered through a variety of interfaces, including those described in detail below, and can allow a user to configure the behavior of the gateway 116 in response to different types of alerts, as well as what types of alerts the subscriber would like to be notified about. In some cases, the alert gateway 116 can upload certain of these preferences (including, for instance, the types of alerts the subscriber would like to receive) to an alert distribution device 108. In some embodiments, multiple subscribers can be associated with a single alert gateway 116, and the alert gateway 116 can be configured to support the preferences of multiple subscribers and/or confirm reception of a given alert by each associated subscriber that should receive that alert. A subscriber can, in some instances, log on to the alert gateway 116 (e.g., using a subscriber identifier and/or a password) and administer the preferences for that subscriber. In some embodiments, the preferences for multiple subscribers can be maintained only at the gateway 116, such that the alert distribution device 108 is only aware of the gateway and sends all applicable alerts to the gateway 116 generally, allowing the gateway to determine the subscribers to which an alert should be sent, while in other embodiments, the alert distribution device 108 can be aware of distinct subscribers associated with the gateway 116 can send alert messages specifically for a particular subscriber(s).

In accordance with various embodiments of the invention, alert gateways can take several forms. Usually (but not always), they are stationary and can be affixed to a particular subscriber location, such as a house, apartment, office building or the like; in some cases, however, an alert gateway may not be stationary and can, for instance, be located in an automobile or the like. In some cases, an alert gateway can even be a mobile device, such as a PSC phone, pager or the like. In any event, an alert gateway may incorporate location-determining equipment, such as a GPS receiver and/or can be capable of being located through triangulation procedures familiar to those skilled in the art. In certain embodiments, an alert gateway can comprise a demarcation device, including for instance, demarcation devices and/or network interface devices ("NID") such as those described in detail in commonly-owned, copending U.S. application Ser. Nos. 10/448,249, 10/367,597, 10/367,596, 10/356,688, and 10/356,338, all previously incorporated by reference.

In addition, devices similar to the demarcation devices and/or NIDs described in the applications previously incorporated by reference and the following commonly-assigned applications can comprise and/or be used as (or in conjunction with) alert gateways in accordance with some embodiments of the invention: U.S. patent application Ser. No.

10/377,280, filed Feb. 27, 2003 by Phillips et al. and entitled "ADSL/DBS NETWORK INTERFACE DEVICE, METHODS AND SYSTEMS FOR USING SAME"; U.S. patent application Ser. No. 10/445,275, filed May 23, 2003 by Casey et al. and entitled "REAL-TIME MEDICAL MONITORING APPLICATION WITH A NETWORK INTERFACE DEVICE"; U.S. patent application Ser. No. 10/452,996, filed Jun. 2, 2003 by Phillips et al. and entitled "SYSTEMS AND METHODS FOR DISTRIBUTING CONTENT OBJECTS IN A TELECOMMUNICATION SYSTEM"; U.S. patent application Ser. No. 10/611,324, filed Jun. 30, 2003 by Casey et al. and entitled "SYSTEM AND METHOD FOR COOLING OF A NETWORK INTERFACE DEVICE"; and U.S. patent application Ser. No. 10/625,863, filed Jul. 22, 2003 by Phillips et al. and entitled "PERSONAL COMMUNICATION SERVICE NETWORK INTERFACE DEVICE."

In accordance with certain embodiments of the invention, an alert gateway may be in communication with one or more pieces of subscriber equipment. Subscriber equipment (which can include devices sometimes referred to as "consumer premises equipment" or "customer premises equipment") can include a variety of communications equipment and/or consumer electronics, including, merely by way of example, telephones (POTS, SIP, VoIP, PBX, PCS, cellular, etc.), video display devices (including televisions, computer monitors, LCD panels, video game consoles and the like), set-top boxes, audio equipment, pagers, and the like, as well as other devices described in detail in the applications previously incorporated by reference.

Figure 1B:
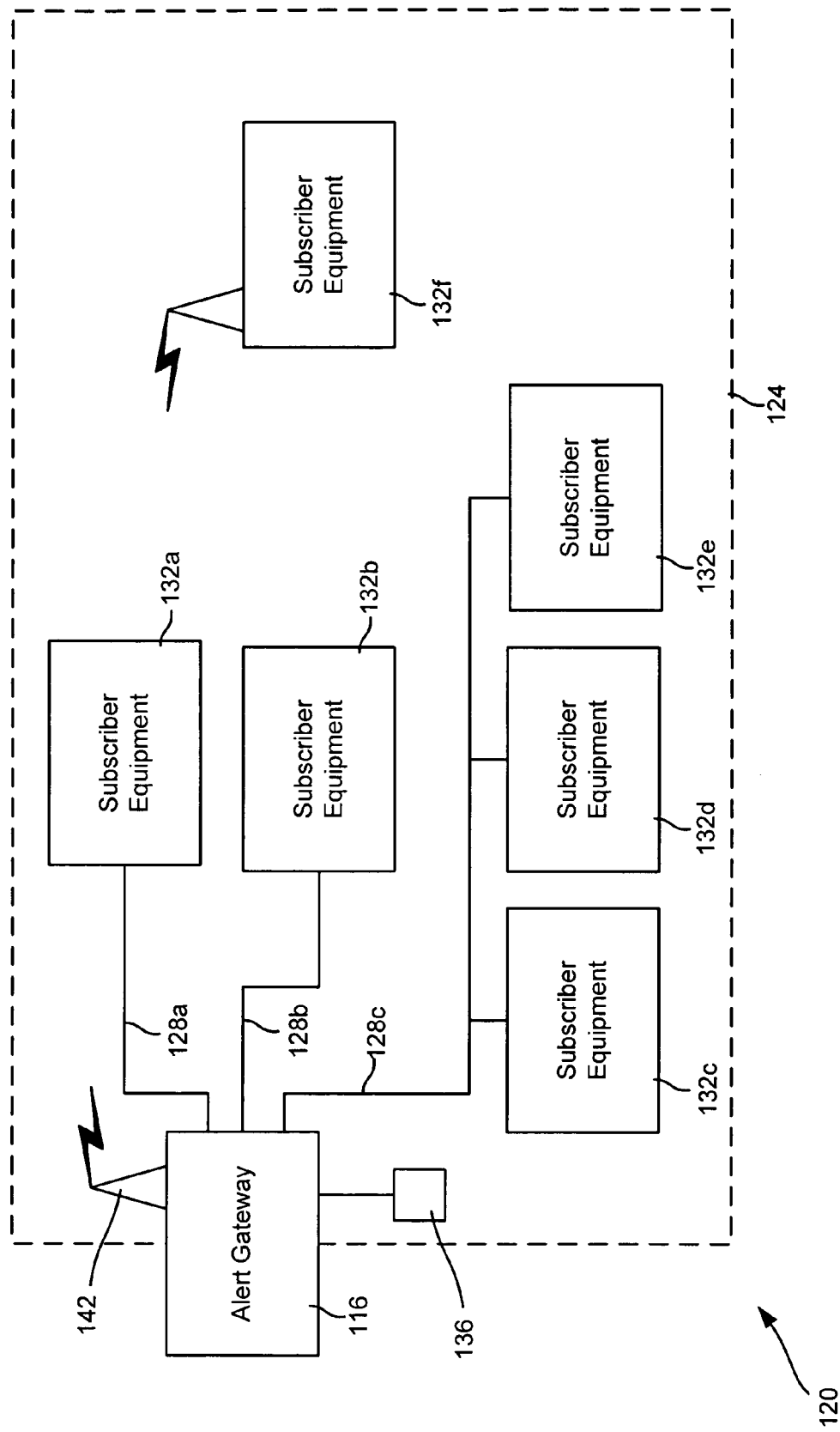
FIGS. 1B and 1C illustrate alert gateways in communication with a plurality of subscriber devices, in accordance with various embodiments of the invention.

Turning now to FIG. 1B, a generalized schematic drawing 120 illustrates the relationship of components of certain embodiments the invention at a subscriber premises 124. An alert gateway 116 can be located at the subscriber premises 124, and may, in some cases, be affixed to an exterior wall of the subscriber premises 124, enabling the gateway 116 to be serviced by provider personnel without disturbing the occupants of the subscriber premises 124. In other embodiments, the alert gateway 116 may be located entirely within the subscriber location and/or may comprise two or more physically separate elements, some of which may be located outside and/or attached to an exterior wall of the subscriber premises, and some of which may be located within the subscriber premises, as discussed in further detail infra.

The alert gateway 116 can receive alert information from a variety of sources, including, merely by way of example, alert distribution devices described herein, using any appropriate communication medium (not shown in FIG. 1B). In addition, the alert gateway 116 can be coupled to one or more internal transport media 128a-c, which can comprise any medium capable of transmitting data packets, including without limitation those media described, for instance, in various of the applications previously incorporated by reference. Notably, embodiments of the alert gateway 116 can support a variety of media topologies, including star (with the alert gateway 116 optionally serving as the hub) and bus configurations, as illustrated by the exemplary configuration of media 128a-c in FIG. 1B. In addition to wired media, the alert gateway 116 can include and/or be in communication with a wireless transceiver 130, which can allow the alert gateway to communicate with a variety of wireless subscriber equipment through any of a variety of wireless communication protocols known in the art, including the IEEE 802.11 series of protocols, the Bluetooth™ standard, various cellular and/or PCS communication protocols, and other wireless communication methods discussed in further detail in the applications previously incorporated by reference.

Thus, in accordance with embodiments of the invention, the alert gateway 116 can communicate with one or more elements of subscriber equipment 132a-f, using any of the transport media (wired and/or wireless) discussed above. In addition, the alert gateway can incorporate and/or can be in communication an alert notification device 136, through one or more of the transport media previously described, including in particular a serial (e.g., RS-232 and/or Universal Serial Bus) connection, an Ethernet connection, an HPNA connection, and the like. In accordance with some embodiments, the alert notification device 136 is a dedicated piece of hardware that is configured to receive alert information from the alert gateway 116 and take some action to notify the subscriber that an alert has been received. Merely by way of example, in certain embodiments, the alert notification device can include a visual signal, including without limitation one or more light emitting diodes, as well as an audible signal, including without limitation, a siren, an alert tone generator, and the like. Thus, when the alert gateway 116 transmits alert information to the alert notification device 136, the alert notification device 136 can display the visual signal and/or display the audible signal to notify the subscriber that an alert has been received.

In a particular exemplary embodiment, the alert notification device is a microprocessor-based device comprising a display screen (such as an LCD screen) in communication with the microprocessor, an alert lamp (such as an LED) in communication with the microprocessor, an input device such as a button, also in communication with the microprocessor. This exemplary alert notification device can also include a communication interface, such as a serial (e.g., RS-232) interface to provide connectivity with, for example, an alert gateway. Thus, upon receipt of an alert from an alert gateway, the microprocessor can instruct the LED to flash and the LCD to display the text of the message, and a subscriber can press the button to indicate receipt of the alert, at which point the alert text will be erased, the LED will go dark, and, optionally, a confirmation message will be sent to the alert gateway. It should be appreciated that other embodiments of alert notification devices may include enhancements and modifications, including speakers, more detailed display devices, and the like. As noted above, an alert notification device, and/or any components thereof, can be incorporated within the alert gateway. Similarly, an alert notification device, and/or any components thereof, can function as an alert means for notifying a user of an alert. In some embodiments, subscriber devices (and/or their components) can function as such alert means.

As discussed further infra, in accordance with certain embodiments of the invention, alert information may be prioritized and/or categorized according to the information included in the alert (e.g., the severity of the condition prompting the alert, the geographic scope of the alert, the subscriber's preferences, and the like). In such embodiments, the alert notification device 136 can be configured to vary the alert notifications in relation to the nature of the alert. Merely by way of example, for relatively low priority alerts, the device 136 merely may display a simple visual signal, such as a flashing LED, while for relatively more urgent alerts, the device 136 may periodically repeat an audible alert and/or may display a relatively more intense visual alert (e.g., a brighter or different colored LED, strobing lights, etc.).

In accordance with further embodiments, the alert notification device 136 can include capabilities to inform the subscriber of the substance of the alert, instead of or in addition to merely signaling the subscriber that an alert has been received. Merely by way of example, some alert notification devices can include a text screen, which can allow the subscribe to view the text of an alert, while others include a speaker and other circuitry known in the art to allow the notification device 136 to audibly inform the user of the text of the alert. (As discussed below, in accordance with certain embodiments, the alert gateway 116 can process the alert information by, inter alia, converting speech to text and/or text to speech; the alert notification device 136 can receive and display/play this processed alert information and/or can include the necessary hardware and/or software to perform such conversions as well). In certain implementations, the alert notification device 136 can include a display screen, which can be used to view visual alert information (which can include, inter alia, graphics, maps, video information and the like).

As mentioned discussed in further detail below, certain embodiments of the invention allow for confirmation that a subscriber has received alert information. Hence, the alert notification device 136 optionally can include a subscriber feedback device, which can be any apparatus that allows the subscriber to interact with the alert notification device 136. The subscriber feedback device, therefore, can be as simple as a single button the subscriber can push to indicate that the subscriber has received the alert; alternatively, the subscriber feedback device can facilitate relatively more complex feedback, and can include a microphone and/or voice recognition facilities, a keyboard and/or pointing device and the like. Thus, certain embodiments can allow for more than mere confirmation that the subscriber has received the alert: Using the subscriber feedback device, the subscriber can request more information about the alert, indicate that he is interested (or not interested) in future related alerts, and the like. This feedback can be transmitted from the alert notification device 136 to the alert gateway 116 and, if necessary transmitted from the alert gateway 116 to an alert distribution device, which may act upon the feedback by sending more information, changing saved preferences for the subscriber, etc.

Figure 1C:
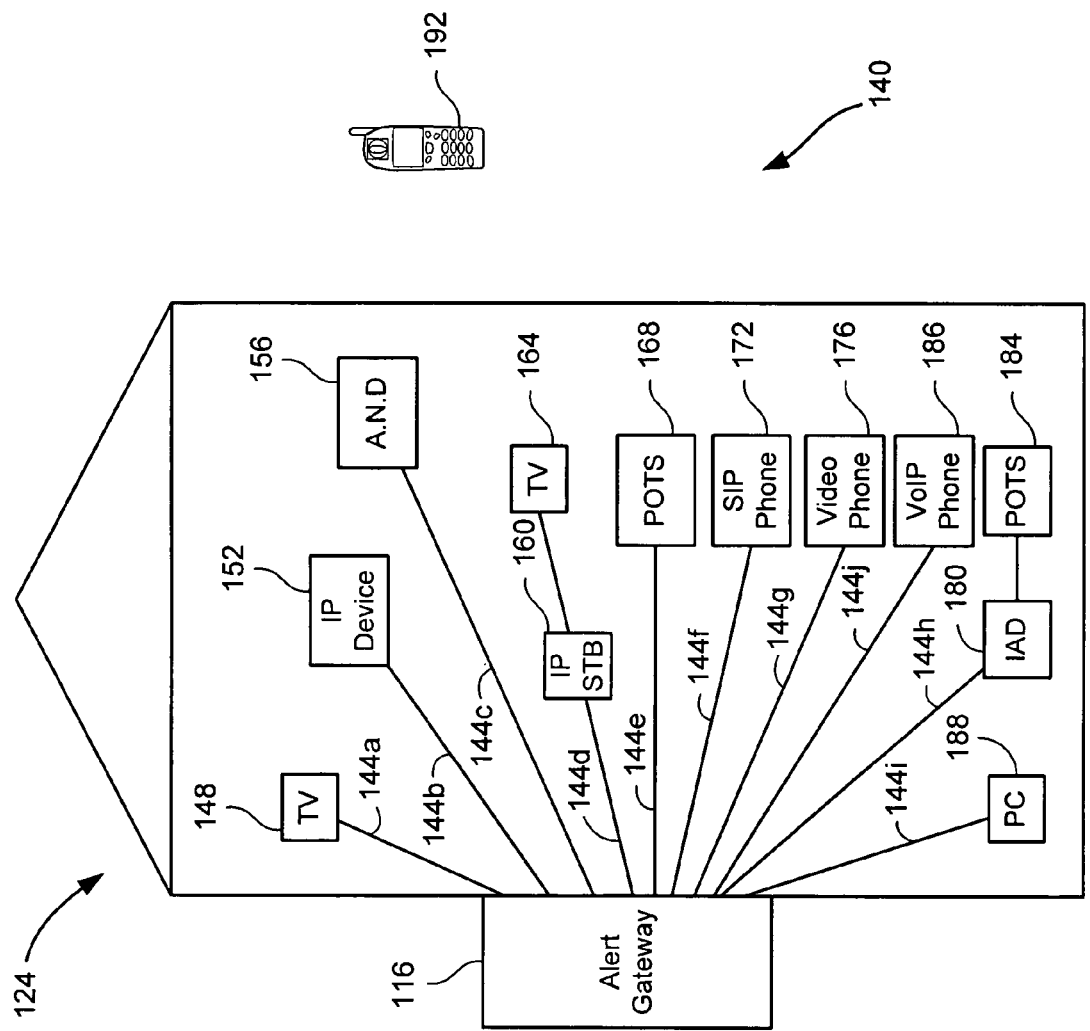

Turning now to FIG. 1C, a schematic diagram 140 illustrates the relationship between the alert gateway 116 and various subscriber equipment located within a subscriber premises 124. In the illustrated embodiment, the alert gateway 116 can be coupled to a plurality of transport media 144a-l, which can provide communication capability between the alert gateway 116 and a variety of subscriber equipment (e.g., 148, 152, 156, 160, 164, 168, 172, 176, 180, 184, 186, 188). Merely by way of example, in the illustrated embodiment, the alert gateway 116 can communicate with a television 148. The television 148 can, for instance, be used to display visual alert information including, merely by way of example, graphics, maps, textual information, and the like, as well as audio alert information. In accordance with some embodiments (including without limitation certain embodiments discussed in various of the applications previously incorporated by reference), the alert gateway 116 can function as a set-top box.

In some such embodiments, the alert gateway 116 can be configured, upon receipt of alert information, to superimpose that alert information over the existing television signal being transmitted on transport medium 144a to television 148, including, for instance, as a picture and picture signal or as a "ticker" running across the bottom, top, etc. of the screen of the television 148. In accordance with other embodiments, the alert gateway 116 can be configured to tune the television 148 to a particular channel and display the alert information on that channel, and/or to display a visual and/or audible alert indicating to the subscriber that alert information has been received and that, if the subscriber wishes to review the alert, the subscriber can tune the television 148 to a particular channel and/or provide other prompting, such as pressing a particular button on a television remote control. Hence, the alert gateway 116 optionally can be configured to receive input from the television 148 and/or a remote control associated with the television 148 and/or the alert gateway 116. In this way, the subscriber can, if desired, respond to the alert information as discussed above.

The alert gateway 116 can also be in communication with an IP device 152. The IP device 152 can be any type of device that is capable of receiving packeted data, in particular Internet Protocol data. Several types of IP devices are described in the applications previously incorporated by reference and various of those devices can be incorporated within or accommodated by embodiments of the present invention. Thus, the alert gateway 116 may be configured to transmit alerts via a transport medium 144b to any device 152 that is capable of receiving and/or transmitting IP data. Consequently, embodiments of the invention allow for a robust architecture in which the alert gateway 116 can transmit IP-formatted alert information to any of a variety of devices capable of receiving EP data.

In other embodiments, the alert gateway 116 can communicate with an alert notification device 156, perhaps in the manner described above with reference to FIG. 1B. In still other embodiments, an alert gateway 116 can communicate with IP set-top box 160, and, by extension, with a television 164. In this way, the interaction with television 164 can be similar to the interaction described above with respect to television 148 with the exception that the set-top box 160 can perform intermediation tasks between the alert gateway 116 and the television 164 such as converting signals from an EP-based format (MPEG, etc.) to a television signal (NTSC, PAL, HDTV, etc.). The set-top box 160 can perform other functions as well, including, without limitation, those described in various of the applications already incorporated by reference.

In accordance with certain embodiments of the invention, the alert gateway 116 can communicate with a variety of telephones, including, merely by way of example, an analog (POTS) telephone 168, a telephone complying with the session-initiation protocol ("SIP") 172, a video phone 176, as well perhaps as an Internet access device (IAD), 180 which can be connected to an analog telephone 184. In addition, a phone 186 complying with the voice over Internet protocol standard ("VOIP") can be attached to the alert gateway 116 as well. Those skilled in the art will appreciate that different embodiments can feature multiple phones of these and other different types, including, for instance private branch exchange ("PBX") systems.

Although each of the telephones 168, 172, 176, 184 can include a variety of features that can be employed in accordance with various embodiments of the present invention, these various embodiments all can have in common the ability to send a ring signal from the alert gateway 116 to the phone, causing the phone to ring upon reception of alert information by the alert gateway 116. Hence, the ringing of the phone can serve as a signal to the subscriber that an alert has been received, similar to the way that a ringing phone generally signifies a that telephone call has been received. (Somewhat similarly, the alert information could be stored as a message in a voice messaging system, which could be managed and/or stored by a demarcation device in accordance with embodiments disclosed in the previously incorporated applications, at the alert gateway, in a telecommunication provider's network, on an answering machine, and/or in other ways known in the art. In this way, embodiments of the invention optionally could allow the voice messaging system's standard message indicator to serve as an alert notification indicator.) In accordance with various embodiments, a different ring tone, pattern etc. can be used to signify an alert than is used to signify an incoming telephone call. In the event a subscriber answers the ringing telephone, the alert information can be played to the user audibly. In addition, some phones, for example the video phone 176, may allow for the display of information and/or video signals and the alert gateway 116 can display textual information and/or video information corresponding to the alert received by the gateway 116.

Optionally, the alert gateway 116 can be configured to prompt the subscriber to press a button on the telephone to indicate reception of the alert information. Alternatively, the alert gateway 116 can be configured to accept as confirmation that the alert was received the mere fact that the subscriber answered the ringing telephone. In other embodiments, the alert gateway 116 can be configured to respond to prompting from the subscriber (e.g., voice prompting and/or pressing a key) to provide more information about the alert and/or to respond in some other manner to the alert.

The alert gateway 116 also can be in communication with a computer 188. The computer 188 can be any kind of computing device, including merely by way of example, a personal computer, a laptop computer, a handheld computer or the like, as long as it is capable of sending data to and/or receiving information from the alert gateway 116. In some embodiments, the computer 188 can be configured with specialized software to enable it to receive information from the alert gateway 116. Alternatively, the computer 188 can receive alert information from the alert gateway in the form of Internet protocols such as HTTP, HTML, and the like, allowing a computer with no specialized software to receive the alert information using standard Internet communication applications (e.g., web browsers, electronic mail clients, and the like). Thus, the alert gateway 116 can be configured to display a visual and/or audible signal on the computer 188, perhaps in the form of a pop-up window, audible alert tone, e-mail message, etc., informing the subscriber that an alert has been received by the alert gateway and/or providing the substance of the alert information. As discussed previously, the PC 188 can include any of a variety of input devices known in the art enabling the user to respond to the alert by, for instance, closing the alert window, clicking on a button indicating that the alert has been received, clicking on a button requesting more information about the alert, or the like.

In addition, the alert gateway 116 can be in communication with a wireless device 192, such as a cellular phone, cordless phone, PCS phone, wireless e-mail device, portable computer (perhaps with a wireless network card), and/or the like. As discussed earlier, the alert gateway can be configured with (as illustrated in FIG. 1C) a transceiver for communicating directly with the wireless device 192 and/or can communicate with the wireless device 192 through an intermediary such as a separate wireless service (e.g., a wireless telephone provider, a wireless e-mail provider, etc.). Thus, the alert gateway 116 can communicate by signaling the wireless device 192 with a wireless signal and/or communicating through a separate provider (such as, for instance, placing a telephone call through the public switched telephone network to a telephone number associated with the wireless device 192 and/or sending e-mail through the Internet to the wireless device 192). Similar to the other devices discussed herein, the wireless device 192 can configured with a device such as a telephone keypad, keyboard, etc., which can be used to allow a subscriber to respond the alert information was received, request more information and the like. Alternatively, the wireless device 192 itself automatically may broadcast a message to the alert gateway 116 indicating that it received the alert information.

In many cases, the alert gateway includes a storage medium (which can include any of those described in the applications previously incorporated by reference). The storage medium can store gateway- and/or subscriber-specific information, including, by way of example, the physical location of the alert gateway. The physical location can be expressed in several different ways, including street address, area code, zip code, GPS coordinates, and the like. Other gateway and/or subscriber-specific information can include preference information about the types of alerts the subscriber is interested in receiving (and/or not receiving), and demographic information about the subscriber. Demographic information about a subscriber can include a broad range of biographical and other information about a subscriber, including merely by way of example and without limitation, the age of the subscriber, health information about the subscriber (including information about allergies and other sensitivities), information about the subscriber's commuting habits, information about the subscriber's purchasing habits, and the like. In addition, demographic information can include information about other members of a subscriber's household. In some embodiments, the subscriber can specify which demographic information is stored by the system.

Figure 2A:
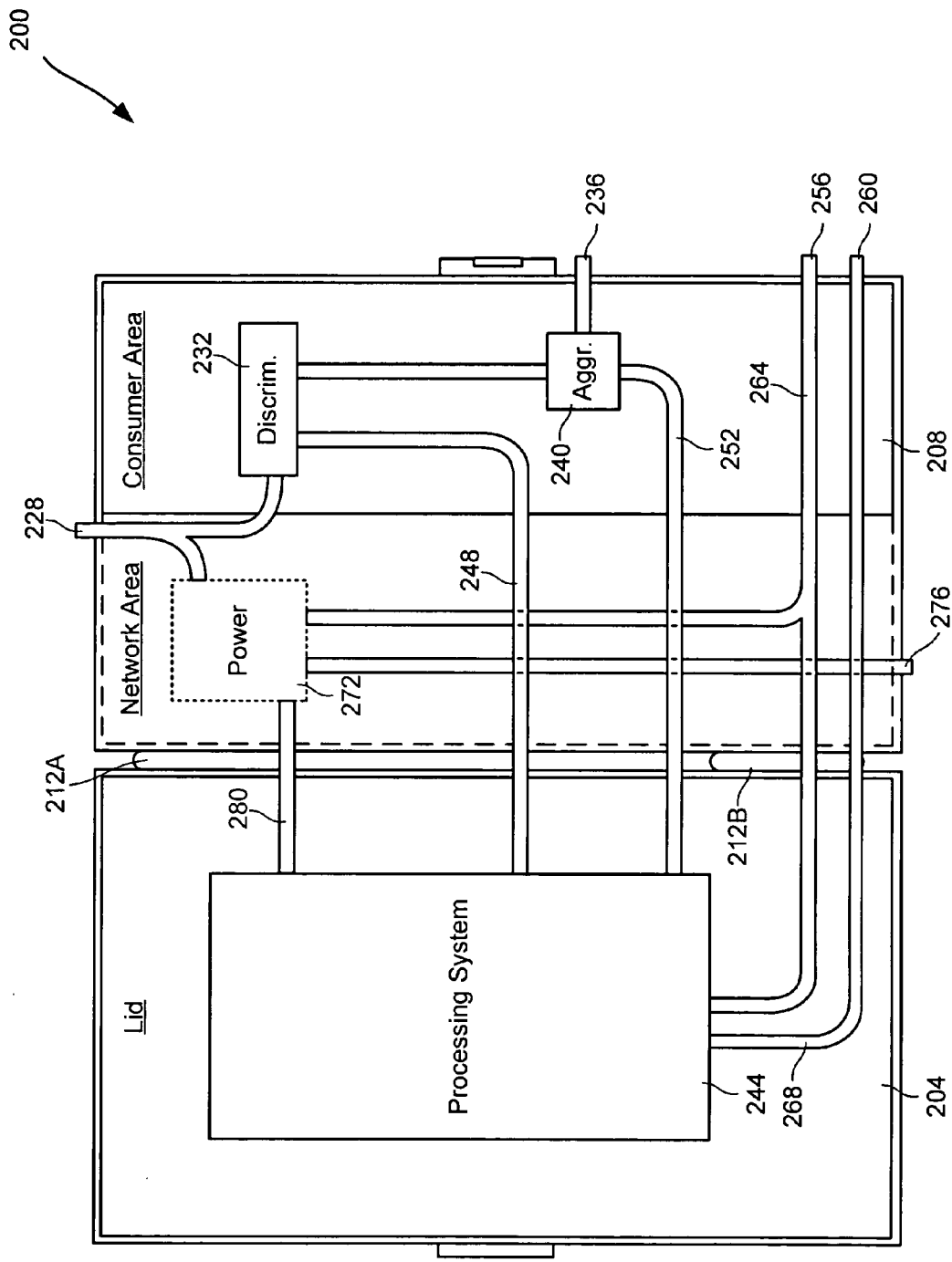
FIGS. 2A and 2B illustrate a network interface device, which can function as an alert gateway, in accordance with various embodiments of the invention.

As mentioned above, in certain embodiments, the alert gateway can be incorporated within and/or be in communication with a demarcation device and/or a NID, including for instance, any of a variety of devices disclosed in the applications previously incorporated by reference. Merely by way of example, FIG. 2A illustrates a NID 200 that can incorporate and/or be in communication with an alert gateway, in accordance with embodiments of the present invention. For purposes of this disclosure, a NID can be considered a device that can serve as the interface between an external transport medium and an internal transport medium and, in particular can act to receive alert information from an alert distribution device (or another source) and distribute that information throughout a subscriber premises and/or to an alert gateway, as appropriate.

Figure 2B:
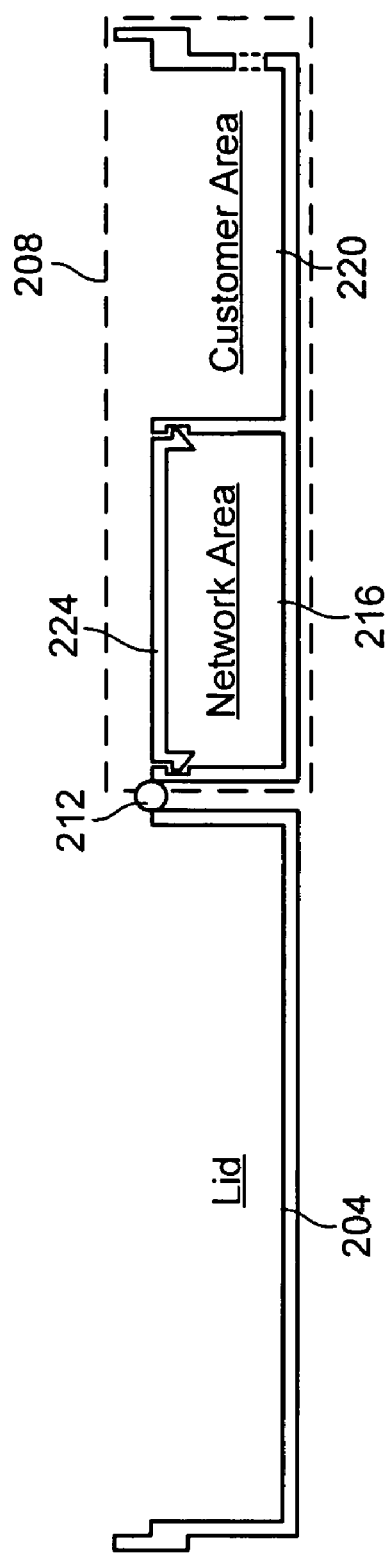

Turning now to FIG. 2A, one exemplary embodiment of a NID 200 is illustrated. In the illustrated embodiment, NID 200 comprises a clamshell design, with a lid portion 204 and a body portion 208 connected by hinges 212A, 212B. Turning now to FIG. 2B, it can be seen that body portion comprises a network area 216 and a customer area 220. Generally, network area 216 is adapted to receive a cover and is designed generally to be accessible only to personnel authorized by the telecommunication service provider. In contrast, when the NID 200 is open, the customer can access the customer area 220 to add, remove or modify components as desired. In this and other ways, NID can serve to isolate the telecommunication service provider's network from the customer's network, as described above. As discussed below, lid portion 204 can contain a processing system 244.

Returning to FIG. 2A, NID 200 can include a first interface 228 for communicating with the provider's external transport medium. Those skilled in the art will recognize that, in some embodiments, as described above, the external transport medium can be the twisted-pair copper "local loop" running from the customer's premises to the telecommunication service provider's local office, and the first interface 228 can allow for the attachment of the local loop to the NID 200. As discussed above, in other embodiments, the external transport medium can be any of a variety of other media, including satellite transmissions, wireless transmissions, coaxial cable, optical fiber, and the like. In fact, in certain embodiments, the external transport medium can comprise multiple transport media (of the same or different types), for which the NID 200 could include multiple interfaces. The NID 200 can receive alert information on the first interface 228 via the external transport medium.

In some embodiments, the NID 200 can function to logically couple or bond a plurality of external transport media to one another, seamlessly increasing the bandwidth available to the customer premises. For instance, a customer premises might have a satellite link to one provider and an ADSL link to another provider, and the NID 200 could combine or multiplex these two links to provide an apparent single, higher-bandwidth connection to the customer premises. Similarly, those skilled in the art will recognize that, in certain of these embodiments, a particular external transport medium (for instance, a satellite link) may be more well-suited to one way transmission of telecommunication information; in such cases, the NID 200 could use a second external transport medium (for instance, an ADSL link) to allow transmission in the other direction. In other embodiments, the NID 200 could be configured to receive alert information from one or more of the external media and/or send confirmation (and/or other) messages to the alert distribution device via one or more of the external media (which may or may not be the same external media as the those used to receive the alert information).

The interface 228 can be coupled to a discrimination device 232, which can be operative to separate information sets received on the first interface 228 (and, conversely, aggregate information sets for transmission on interface 228). Merely by way of example, in particular embodiments, the discrimination device 232 can separate POTS information from other telecommunication information and/or isolate signals on the internal transport medium from the external transport medium (and vice-versa). In this way, for instance, a provider can transmit both alert information and other telecommunication information (including, merely by way of example POTS telephone signals) via a common transport medium, and the NID 200 can separate the information sets and route them appropriately. Thus, for example, the discrimination device 232 can route alert information (perhaps along with other data) along one path, while routing analog telephone signals along another path.

In some embodiments, for instance xDSL implementations, the discrimination device 232 can comprise one or more filters. Such filters can include (but are not limited to) high-pass, low-pass and/or band pass filters. For instance, in an xDSL implementation, the discrimination device 232 might include a high-pass and/or low-pass filter for separating high-frequency (e.g., data) from low frequency (e.g., POTS) information. In other embodiments, the discrimination device 232 can comprise many other types of filters, including both digital and analog filters. In a sense, telecommunication information (including alert information) can be thought of as being grouped into different information sets, depending, inter alia, on the type and/or content of the information, as discussed more fully in the applications previously incorporated by reference. The discrimination device 232 can be operable to separate information sets through a variety of criteria, including for example, by frequency, by destination device, information type, frequency, and the like. In certain embodiments, as discussed below, alert information can comprise one or more information sets. Further, in certain embodiments, information sets can be multiplexed (for instance, using various time-division multiplexing or wave-division multiplexing schemes known in the art) for transmission over an external transport medium, and discrimination device 232 can comprise a de-multiplexer capable of separating multiplexed signals and, optionally, routing each signal to the appropriate destination.

In the illustrated embodiment, the discrimination device 232 is in communication with a second interface 236, which can interface with the telephone wires at the customer premises to provide traditional analog telephone service. In some embodiments, an aggregator 240 can be situated between the discrimination device 232 and the second interface 236 to allow additional (perhaps non-POTS) information sets to be sent and received through the second interface 236 simultaneously with the POTS information. This can include, for example, aggregating information sets for transmission of an HPNA (or HPNA+) signal over an internal transport medium.

The discrimination device can also be coupled to a processing system 244, which in the illustrated embodiment is located in the lid portion 204, and all non-POTS information sets (including, for instance, alert information) can be routed to processing system 244 for additional processing and/or routing. The processing system 244 is described in detail below, but can, in general, comprise one or microprocessors, including digital signal processor ("DSP") chips, and/or memory devices, including both volatile and nonvolatile memories, as well as a variety of read-only memory devices known in the art, such as programmable read only memory ("PROM") devices and erasable programmable read only memory ("EPROM") devices (a term which should be interpreted to include electrically erasable programmable ("EEPROM") devices, in addition to other EPROM devices) and storage devices (including hard disk drives, optical drives and other media) In fact, the processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and OpenBSD™ operating systems.

Telecommunication information (or information sets) can be processed by processing system 244 in a variety of ways, including, for example, routing a given information set to a particular interface, transforming information (for example, encoding/decoding information and converting between different transport protocols), storing information, filtering information, and any of the other functions described herein with respect to processing systems. With respect to alert information, the processing system 244 can provide a plurality of processing functions, including without limitation, performing text-to-speech (and/or speech-to-text) transformations, extraction (or addition) of closed-captioning information to a video signal, aggregation of multiple information sets into a combined set (including, for instance, superimposing alert information on an existing video signal for transmission to and/or display be a video display), and the like. In general, the processing system can include the necessary hardware, software and/or firmware to provide any of the alert processing functions described in further detail herein.

In certain embodiments, processing system 244 can also serve as the termination point for an external transport medium; for instance the processing system 244 can incorporate the functionality of an xDSL modem. In other embodiments, the processing system 244 can serve to identify quality of service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In accordance with some embodiments, the processing system 244 can be in communication with the aggregator 240, which, as discussed above, can aggregate non-POTS information sets received from processing system 244 and/or POTS information sets received directly from discrimination device 232 for consolidated transmission via the second interface 236, among other functions. In effect, the discrimination device 232 and the aggregator 240 (perhaps in conjunction with the processing system 244) can function to separate telecommunication information received on the external interface 228 into a set of POTS telecommunication information and a set of non-POTS telecommunication (wherein POTS information can be understood to be ordinary analog telephone signals, and non-POTS information can be understood to include all other telecommunication information, including for example, alert information), route the non-POTS information via transport medium 248 to the processing system 244 for processing, and route the POTS information to the internal interface 236 for transmission to the internal transport medium. In certain embodiments, one or more sets of non-POTS information can be routed (e.g., via transport medium 252) for transmission through interface 236, perhaps in combination with one or more sets of POTS information.

Of course, the discrimination device 232 and the aggregator 240 can perform similar functions in reverse (i.e., to separate and recombine different sets of telecommunication information received on the interface 236 from the customer's premises). Thus, in some embodiments, both the discrimination device 232 and the aggregator 240 each can perform a combined discrimination device-aggregator function, depending on the direction of information flow and can, in fact, support simultaneous (and/or near-simultaneous) bidirectional information flow. In fact, while termed "discrimination device" and "aggregator" for ease of description, those two devices can actually be relatively similar (and even, in some cases, identical), and further, their functionality can, in some embodiments, be incorporated into a single device, which could be coupled to the first interface 228, the second interface 236, and the processing system 244, and which could route information sets among any of those components as necessary. Moreover, as described below, the functionality of the discrimination device 232 and/or the aggregator 240 can be incorporated into the processing system 244; likewise, the discrimination device 232 can incorporate the interface 228 and/or aggregator 240 can incorporate the interface 236, such that the discrimination device 232 and/or the aggregator 240 comprise the necessary components to be coupled directly to the external and internal transport media, respectively.

The discrimination device 232 and/or the aggregator 240 can also serve another function in certain embodiments: Since the external transport medium is coupled to the first interface 228 and the internal transport medium can be coupled to, inter alia, the second interface 236, the discrimination 232 device and/or aggregator 240 can serve as an isolation device for intermediating between the two media, such that when a topological change occurs in one of the media, only the NID interface need be changed, and the other transport medium is not affected. In some such embodiments, the discrimination device 232 and/or aggregator 240 can serve to intermediate (including protocol translation and the like) between the interfaces 232, 240, allowing either the internal or the external transport medium to be upgraded or changed without impacting the other transport medium. Of course, in certain embodiments, this isolation function also could be performed by the processing system 244. In yet other embodiments, the isolation device might comprise a separate piece of hardware in communication with discrimination device 232, aggregator 240 and/or processing system 244.

In certain embodiments, the NID 200 can have one or more additional interfaces 256, 260 in communication with processing system 244 via transport media 264, 268, respectively. These additional interfaces 256, 260 can be adapted to communicate with any of a variety of internal transport media to send/receive telecommunication information to/from the customer premises. For instance, one interface 256 can be a coaxial interface for connection to RG6 and/or RG59 cable, and another interface 260 can be an RJ45 and/or RJ11 interface for connection to unshielded twisted pair cable (which can, for instance, form a 10Base-T Ethernet network).

In certain embodiments, the NID 200 can comprise a line driver (not shown on FIG. 2A), coupled to the processing system 244 and/or the aggregator 240. The line driver can function to allow conversion between various network formats and media, allowing a variety of different media types (e.g., twisted pair and/or coaxial cable, in accordance with the HPNA and HPNA+standards, as well, perhaps, as the customer premises' A/C wiring, in accordance, for example, with the HomePlug™ standard) to transport combined POTS and non-POTS information sets. If necessary, one or more different line drivers can be used to accommodate a variety of transport media.

The ability of NID 200 to support multiple interfaces of different types allows great flexibility in routing telecommunication information throughout the customer premises. Merely by way of example, if interface 228 receives telecommunication information that includes digitally-encoded video signals (e.g., MPEG-2 data), the information set that includes the encoded video signals can be routed by discrimination device 232 to processing system 244, which can decode the signals into an RF-modulated NTSC, HDTV and/or PAL format and transmit the signals via transport medium 264 to coaxial interface 256, where it can be transmitted via coaxial cable to one or more televisions at the customer premises. Alternatively, if the customer has a digital set-top box located at the television, the encoded signals can be routed by processing system 244 (perhaps through the appropriate line driver) to aggregator 240, where the signals can be transferred through interface 236 to the set-top box for decoding.

In some embodiments, the NID 200 might receive IP data, including for example alert information, (perhaps combined with other types of telecommunication information) on interface 228. The information set comprising the IP data can be routed by the discrimination device 232 via a transport medium 248 to the processing system 244, where it can be processed, and depending on the embodiment, routed via another transport medium 252 to the customer's existing telephone wiring (perhaps using an interface 236, optionally in conjunction with an aggregator 240 and/or one or more line drivers), routed to a 10Base-T network (perhaps a transport medium 268 and an interface 260), routed to a coaxial cable (e.g., using a transport medium 264 and an interface 256), or routed via a wireless interface (not shown in FIG. 2A). Alternatively, the IP data can be routed to any combination of these interfaces, and any of these interfaces could also receive IP or other telecommunication information from subscriber equipment at the customer premises, for routing to the processing system 244. In this way, NID 200 can allow virtually unlimited connectivity options for each CPE at the customer premises. Adding to the flexibility of the NID 200, the processing system 244 can include the necessary components to serve, for instance, as a cable, wireless, or xDSL modem, as well as components necessary to serve as an Ethernet hub, switch, router or gateway, the functions of each of which are familiar to those skilled in the art.

Hence, in an exemplary embodiment in which the NID 200 acts as an alert gateway, the NID 200 can receive alert information, which in some cases can be packeted, Internet Protocol data. Once received by the NID 200, the alert information can be routed to the processing system, where it can be processed as described below to the extent necessary. In some cases, for instance, processing can comprise distilling the alert from the alert information, as well as analyzing the alert information to determine how to handle the alert. Merely by way of example, the alert gateway (in this case the NID 200) can be configured to route different types of alerts to different subscriber equipment and/or treat different types of alerts differently, so that, for instance, a relatively low priority alert (e.g., a severe thunderstorm alert) might only be routed to subscriber equipment during certain hours and/or might be routed only to certain equipment (e.g., currently operating video devices) while a relatively high priority alert (e.g., a tornado alert) might be routed to all devices at all times of the day, so that the subscriber can be awoken, for instance, by a ringing telephone in time to take necessary action to avoid being caught in the tornado.

As this example illustrates, alert gateways can be capable of analyzing and discriminating between alert types (based, in some cases, on the alert information associated with the alert) and different alert types differently, by routing the alerts to different subscriber equipment, requiring or not requiring receipt confirmation, treating alerts differently according to the time of day and/or whether a subscriber is present, and the like. In cases in which the alert gateway is incorporated within a NID, the processing system 244 can handle this function, and can route the alert to different interfaces and/or with different distribution addresses according to the analysis.

In certain embodiments, the NID 200 can comprise a power supply 272 for providing electrical power to the components in the NID 200. The power supply 272 can be powered through electrical current carried on the external transport medium and received on an external interface 228. Alternatively, power supply can receive electrical current from a coaxial interface (e.g., 256), or through a dedicated transformer plugged into an A/C outlet at customer premises, e.g., through a 12V connection 276. The processing system 244 can be powered by a connection 280 to the power supply 272, or through one or more separate power sources, including perhaps the A/C power of the customer premises. In some embodiments, the processing system 244 might have its own power supply.

Figure 3:
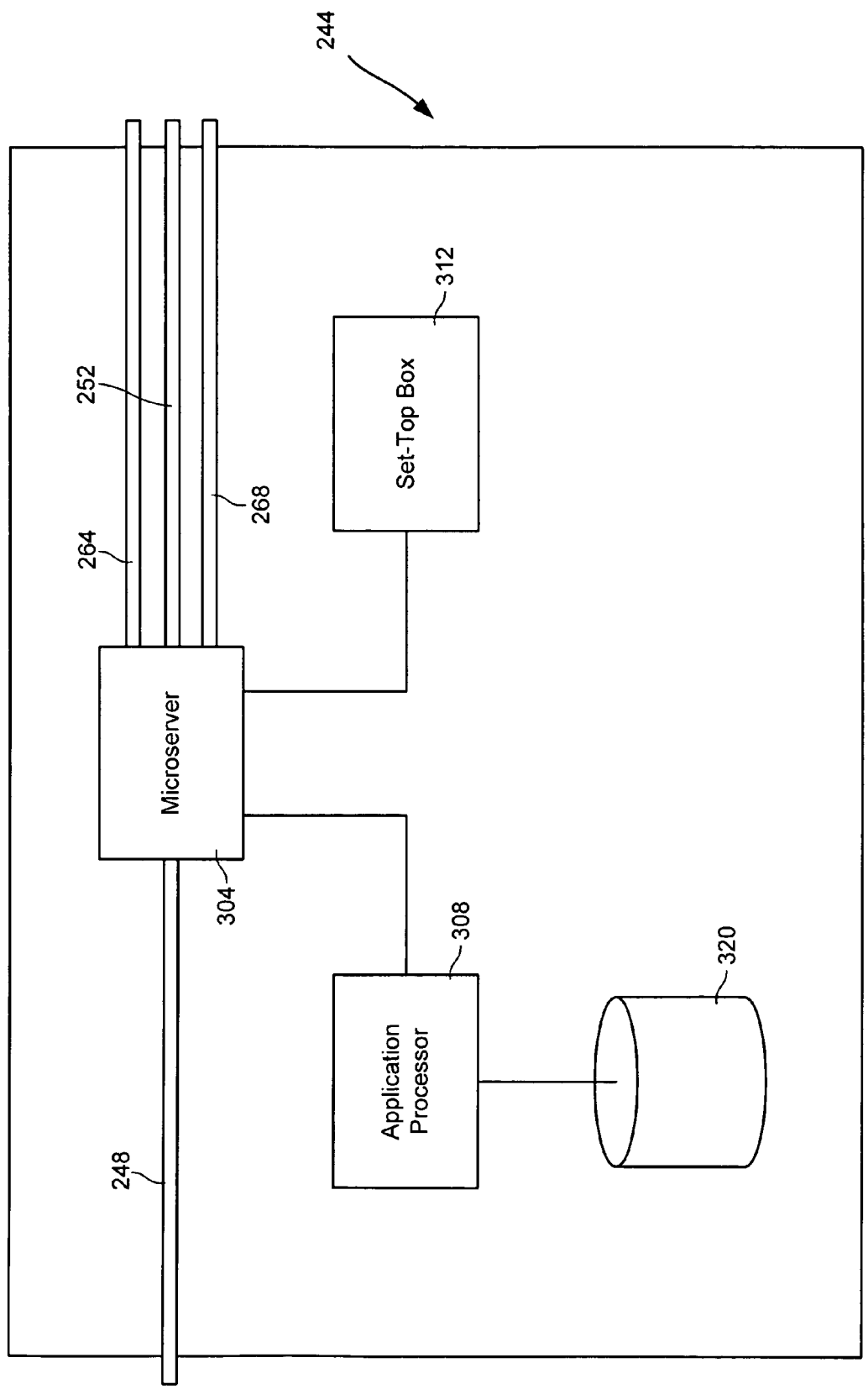
FIG. 3 illustrates schematically certain components of a network interface devices, in accordance with various embodiments of the invention.

As mentioned above, the processing system 244 can comprise a plurality of processing devices, and each processing device can comprise multiple components, including microprocessors, memory devices, storage devices and the like. Merely by way of example, FIG. 3 provides a detailed illustration of exemplary processing system 244, which comprises multiple processing devices 304, 308, 312. In accordance with the exemplified embodiment, a transport medium 248 links the processing system 244 with an external transport medium (perhaps via a discrimination device and/or interface, as described above).

The transport medium 248 can be coupled to a microserver 304, such that any information received by the processing system 244 via the transport medium 248 is first processed by microserver 304. Some embodiments of the invention include microservers similar to those described in the applications previously incorporated by reference. The microserver 304 can, in some embodiments, be the equivalent of a server computer, complete with memory devices, storage devices, and the like, each of which is known in the art and none of which is illustrated on FIG. 3. In certain embodiments, the microserver 304 serves as the controller for the NID 200, overseeing the NID's configuration and monitoring performance; in some such embodiments, the controller functions can be accessed using a web browser. Depending on the embodiment, the microserver 304 can be capable of performing a wide variety of additional functions, including functions related to administering any local area network comprised by the internal transport medium. For instance, the microserver 304 can function as an xDSL modem in certain embodiments, allowing a home network attached to the NID to transmit and receive data via an xDSL connection to a telecommunication service provider. The microserver 304 can, in some cases, also function as a hub, bridge, switch or router.

Further examples of functions of microservers in various embodiments include a dynamic host configuration protocol ("DHCP") server, which, as those skilled in the art will appreciate, allows for flexible configuration of an IP network using any internal transport medium attached to the NID, and a network address translation ("NAT") server, which provides some security against unauthorized use of the customer's network. The microserver 304 can also function as a HyperText Transport Protocol ("HTTP") server, which, among other benefits, can allow configuration of the NID through a convenient web interface, as well as a bridge, switch or router, which can be capable of supporting advanced routing techniques, such as MPLS and EFM, to name a few. Microserver 304 can function further to manage quality of service requirements.

In addition to these functions, the microserver 304 can be configured to route information sets received via the transport medium 248, according to the type of telecommunication information in the set (e.g., encoded video, alert information, other IP data, etc.) as well as any addressing information associated with either the set or the information it comprises (e.g., a specified destination port or network address for a particular subset of telecommunication information). In this way, the microserver 304 can serve a switching function somewhat similar to that described with respect to discrimination device 232 described in relation to FIG. 2A. For instance, if IP data is received by microserver 304, such data can be routed to an Ethernet connection, to the existing telephone wiring (e.g., in an HPNA implementation), or to any other appropriate medium (perhaps via an appropriate line driver). Similarly, the microserver 304 can serve to route alerts and/or alert information to the appropriate subscriber equipment and/or alert notification devices. In fact, in certain embodiments, processing system 244 (and in particular the microserver 304) can incorporate the functionality of a discrimination device 232 and/or an aggregator 240, rendering those components optional.

In addition to the microserver 304, the processing system 244 can include other components, including, for instance, an application server 308 and a set-top box 312, which, in the illustrated embodiment, are coupled to the microserver 304. The application server 308 can comprise the equivalent of a computer, as described above, and thus can comprise one or more storage devices, such as a hard disk drive 320, as well as memory devices, microprocessors and the like, to enable it to store and process telecommunication information and other data. In certain embodiments, the application server 308 can perform tasks with processing, memory and/or storage requirements that render the microserver 304 unsuitable, including a wide variety of consumer applications. For instance, the application server 308 can act as a digital recorder for storing video (perhaps as a video-on-demand server or a personal video recorder), a file and/or application server for a home network attached to the NID, a Voice over IP ("VoIP") server, caller identification server, or voice gateway for a telephone system attached to the NID. The application server 308 can also function as a home security server, allowing the control of various features and configuration options for a home security system. Additionally, the application server 308 either on its own or in conjunction with the microserver 312, process the alert and/or alert information, including without limitation performing the processing tasks described by reference to the microserver 304, above.

The set-top box 312, which, in some embodiments, can be coupled to microserver 304 as illustrated on FIG. 3, can provide traditional set-top box functionality (e.g., decoding of television signals, frequency switching, etc.), as well as provide enhanced features, including, for example, the provision of picture-in-picture signals for non picture-in-picture televisions, the provision of video on demand, personal video recorder features, and many other such features. Thus, the set-top box 312 can be used to, for example, insert an alert into a video signal, provide notification of the reception of an alert, provide an interface (e.g., through a remote control) for the subscriber to confirm reception of the alert, request more information, etc.

The processing system 244 can have multiple means of input and output. Merely by way of example, the microserver 304 can communicate with one or more external transport media (perhaps, as discussed above, via intermediary devices) using one or more transport media (e.g., 248). The processing system 244 (and, specifically, the microserver 304) also can communicate with one or more internal transport media (for example category 5, 5e and/or 6 unshielded twisted pair wire 268, RG6 and/or RG59 coaxial cable 264, and category 3 unshielded twisted pair copper (telephone) wire 252), again possibly via intermediary devices, as discussed with reference to FIG. 2A. Notably, some embodiments of the processing system 244 can include interfaces for multiple transport media of a particular type, for instance, if the processing system 244 (and, in particular, the microserver 304) serves as a networking hub, switch or router. The processing system 244 can also have infra-red and radio-frequency receivers and/or transmitters, for instance to allow use of a remote control device, as well as wireless transceivers, for instance to allow wireless (e.g., IEEE 802.11) networking.

As illustrated on FIG. 3, in some embodiments, the microserver 304 manages the connections between application server 308, set-top box 312 and transport media 248, 252, 264, 268, routing data as necessary. In other embodiments, each device 304, 308, 312 can have independent connections to one or more transport media. 101061 It should be recognized that the devices within the processing system 244 are described for illustrative purposes only. The functionality described above with respect to the microserver 304, application server 308 and set-top box 312, respectively, each could be incorporated into a single device within the processing system 244. Alternatively, their functions described herein could be divided among any number of processors and devices within processing system 244. Thus, the division of functions among devices within processing system 244 is discretionary and should not be considered to limit the scope of the invention.

Figure 4:
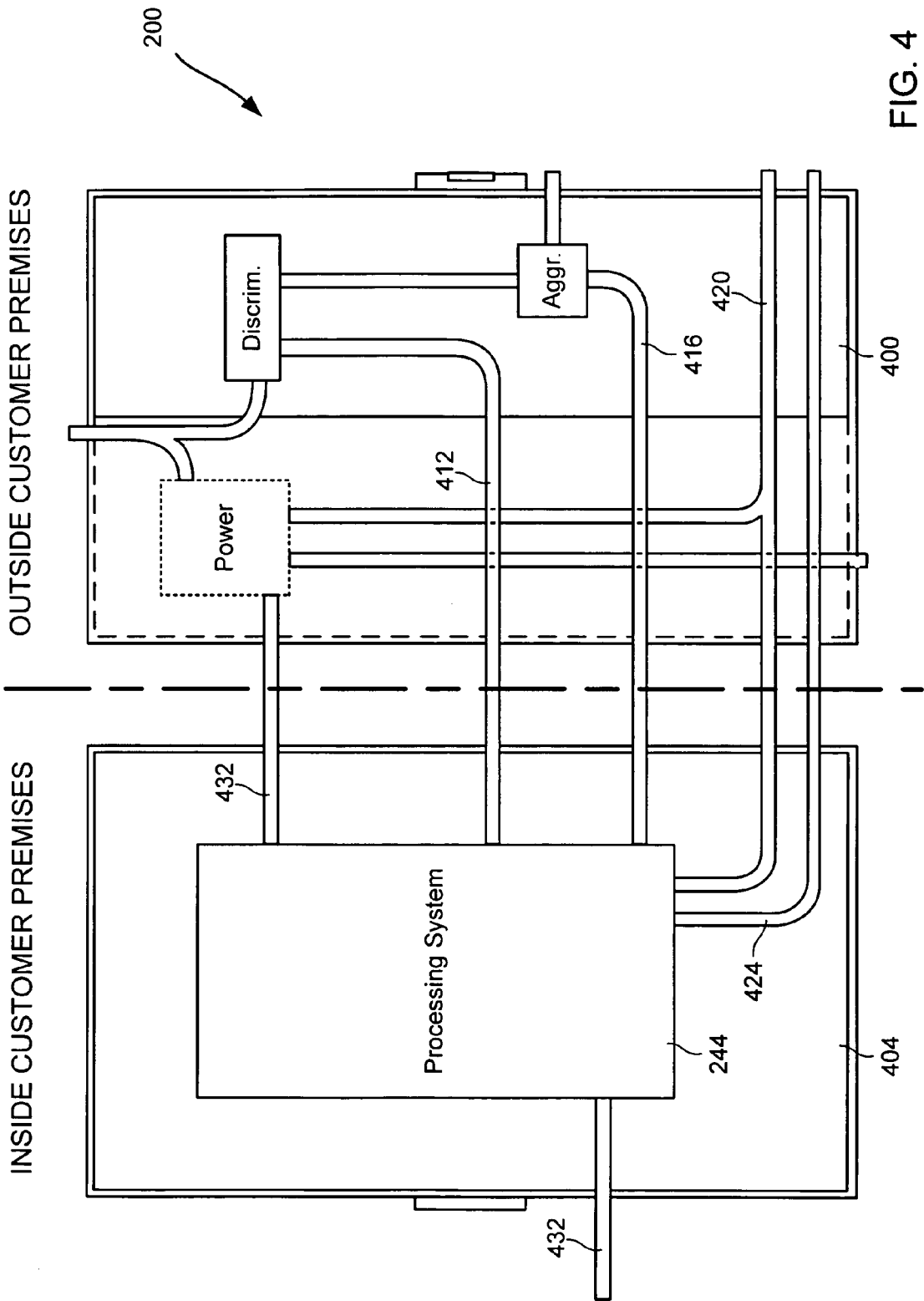
FIG. 4 illustrates an exemplary network interface than can be disposed partially on the exterior of a subscriber premises, in accordance with various embodiments of the invention.

In accordance with some embodiments, the an alert gateway might comprise multiple enclosures, each located in a different location and in communication with one another. One or more of those enclosures might be associated with a NID. Merely by way of example, FIG. 4 illustrates an alternative embodiment of the invention, including a NID 400 and a separate processing system 404. In the illustrated embodiment, for example, a demarcation device (e.g., the NID 400) can provide external (e.g., with a telecommunication network) and internal (e.g., with the subscriber premises) communication capabilities, and the processing system 404 can provide processing capabilities, including, for example, functioning as an alert gateway. In this way, processing system 404 can be located in a more secure area (for instance, inside the customer premises), while the NID 400 can be located conveniently at the exterior of the customer premises, where it can be accessed easily by service personnel. (Of course, it should be noted that a NID can also be hardened, so that it can be securely located in its entirety on the exterior of the customer premises, as, for instance, in the embodiments discussed above.) In some embodiments, the processing system 404 can be in communication with a NID 400 via similar transport media 412, 416, 420, 424 to those discussed with respect to FIG. 3 (248, 252, 264, 268, respectively) and can include all of the same functionality of the embodiments discussed above. As illustrated in FIG. 4, the processing system 404 generally can draw power from its own source 428, although it can also be powered by the NID 400, either via one of the transport media 412, 416, 420, 424 or through a separate power connection 432.

Figure 5A:
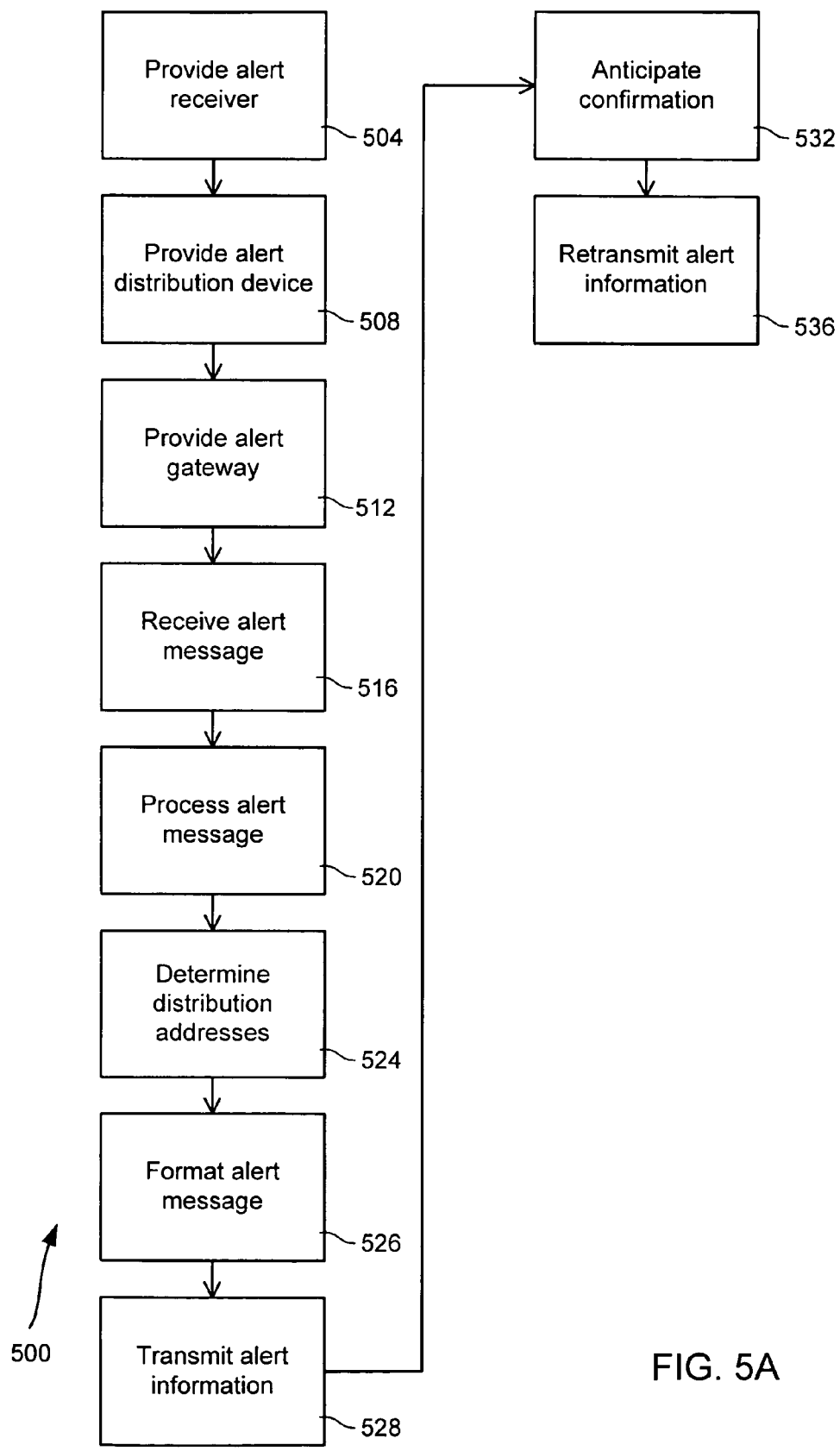
FIGS. 5A and 5B are process flow diagrams illustrating a method of distributing public information in accordance with embodiments of the invention.
Figure 5B:
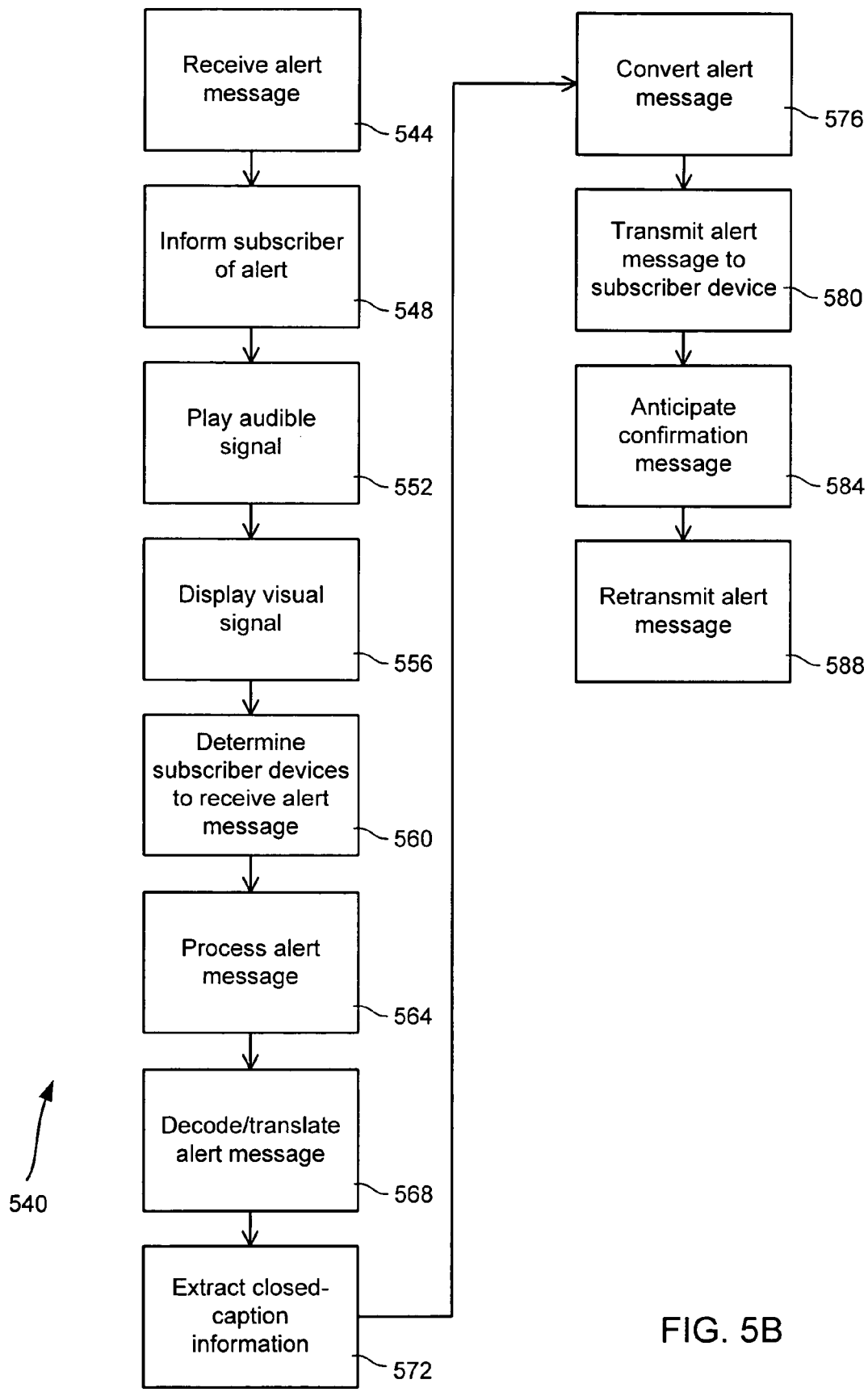
Figure 6:
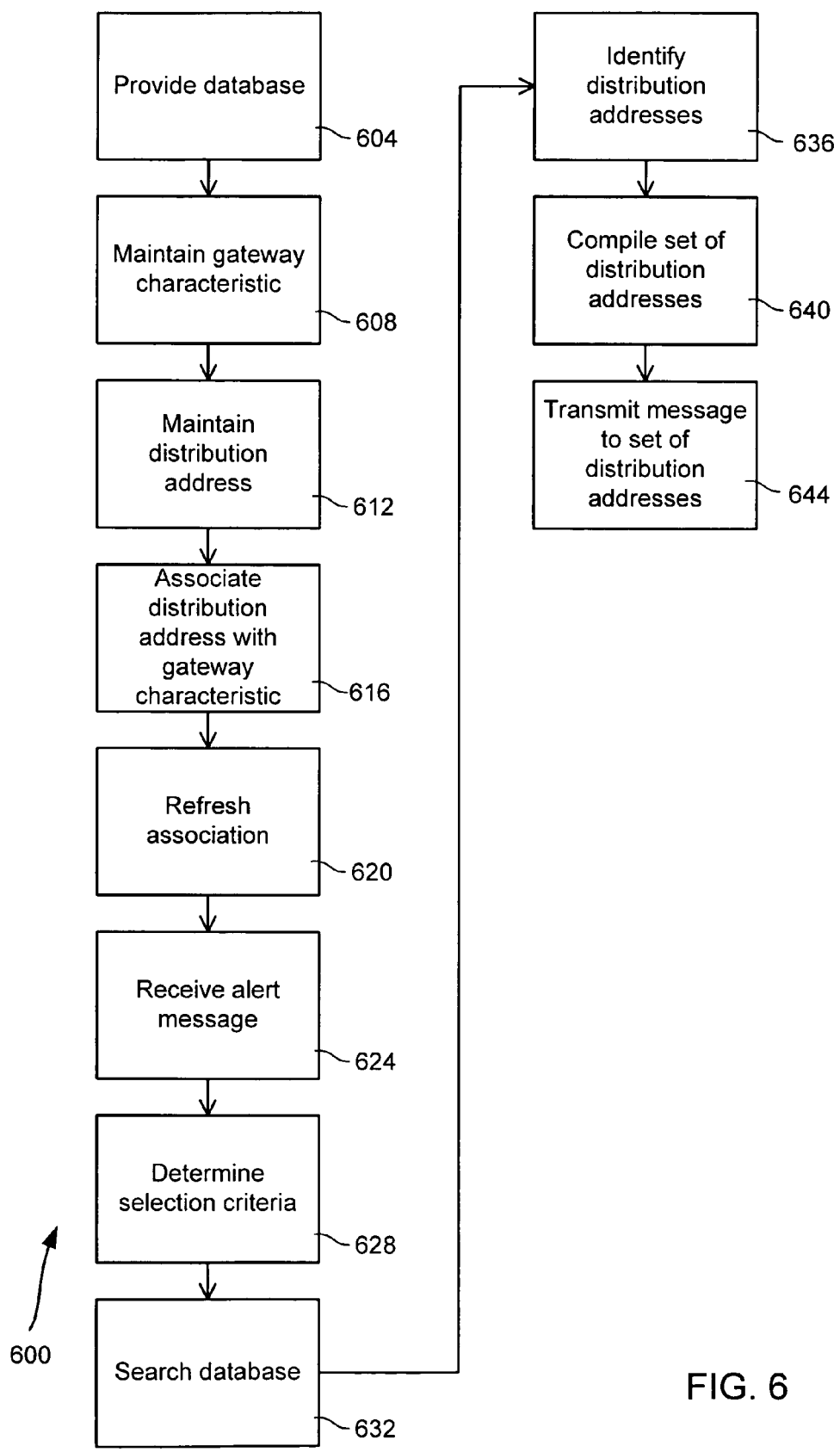
FIG. 6 is a process flow diagram illustrating a method of determining a set of distribution addresses to which public information should be distributed, in accordance with embodiments of the invention.

Other embodiments of the invention provide methods of providing an alert to one or more subscribers. Turning now to FIGS. 5A, 5B and 6, exemplary methods of providing an alert are illustrated in accordance with embodiments of the invention. These exemplary methods, for illustrative purposes, are described with respect to the exemplary systems discussed above. Thus, those skilled in the art will recognize, based on the disclosure herein, than the procedures discussed with respect to these methods can be performed by the structures discussed above. Nonetheless, it should be recognized that the methods are not limited to any particular system of implementation and the scope of the invention therefore should not be interpreted as being limited to any structural features discussed in relation to the exemplary methods. Similarly, while for convenience the procedures embodied by the exemplary methods are discussed in a particular order herein, it should be recognized that certain illustrated steps can be omitted and that the ordering of the steps herein is discretionary and should not be interpreted as limiting the scope of the invention unless a particular ordering is specifically described as mandatory.

FIG. 5A provides an exemplary method 500 for distributing an alert to a set of one or more distribution addresses. The method 500 optionally can comprise providing an alert receiver (block 504) and/or an alert distribution device (block 508), which can be devices similar to those described above and/or can be incorporated within a single device. As noted above, the alert receiver and/or alert distribution device can be capable of receiving an alert message, which can comprise an alert and/or additional alert information. The method 500 also optionally comprises providing an alert gateway (block 512), which likewise can be similar to the alert gateways described above, and which can be capable of receiving an alert (e.g., from the alert distribution device), in some cases as part of an alert message.

At block 516, the alert message can be received, perhaps by an alert receiver and/or an interface in communication with an alert distribution device. As noted above, the alert message can comprise an alert and/or alert information associated with the alert. In some embodiments, receiving the alert message can comprise receiving the alert message at an alert receiver and forwarding the alert message to an alert distribution device for further action. In other embodiments, the alert message may be received directly by an alert distribution device, which may include the necessary hardware to receive the alert. In many cases, the format of an alert message can vary widely. For instance, an alert message may comprise an audio and/or video signal received over the airways, via a cable distribution medium, through the Internet, and the like. In other cases, the alert message can be simple textual message. In still other cases, the alert message can comprise one or more formatted data files, including for example, HTML and/or XML files.

If necessary, the alert message can be processed (block 520). Alert processing can be performed at one or more stages of the process (e.g., after reception by the alert receiver/alert distribution device, immediately prior to transmission to an alert gateway, after reception by the alert gateway, etc.) In some embodiments, the alert message can be processed after being received at the alert distribution device, as shown by FIG. 5A.

In some cases, processing of the alert message can be performed by the alert distribution device, the alert receiver and/or the alert gateway (and/or, more specifically, by a processor incorporated within one or more of those devices and executing software instructions). In other cases, the processing can be performed by a computer in communication with one of these devices. Processing an alert message may comprise any of several procedures, including those procedures described elsewhere herein. For instance, as noted above, in some cases, an alert message may comprise an alert and associated alert information. In such cases, processing the alert may comprise extracting (i.e., reading) the alert information from the alert message, so that the alert information can be used to determine to which distribution addresses the alert should be transmitted. Optionally, the alert information can be removed from the alert message, such that, when transmitted by the distribution device, the alert message can comprise only the alert itself. Alternatively, the alert information can remain in the alert message and thereby be transmitted, along with (or without) the alert by the alert distribution device.

Processing can comprise other operations, as well, including without limitation converting and/or modifying the format and/or content of the alert message. For instance, in embodiments in which the alert message comprises video information, processing can include transforming the video signals into a different format (e.g., NTSC to MPEG, MPEG2 to MPEG4, etc.) to text (e.g., using speech recognition software and/or algorithms, including various of those known in the art) and/or to audio (e.g., by removing the video information from the signal, perhaps to allow for lower-bandwidth transmission). Similarly, for alert messages that comprise primarily text and/or audio information, still images and/or video can be added to enhance the utility of the alert message. Merely by way of example, if a received alert message includes a weather alert for a particular county, embodiments of the present invention can be configured to acquire (e.g., by searching the Internet, etc.) a current, forecasted and/or recent radar image for that locale and incorporate that image into the alert message before transmitting the alert message. In this respect, embodiments of the invention can be configured to interface with other public sources of information, including, merely by way of example, radar maps and forecast information available online through the National Weather Service and/or National Oceanic and Atmospheric Administration. In other embodiments of the invention, the alert distribution device can be configured to create alerts by periodically and/or on demand acquiring such information and transmitting it to one or more alert gateways, perhaps in accordance with certain subscriber preferences.

At block 524, the alert distribution device determines a set of one or more distribution addresses to which the alert pertains and/or should be transmitted. One exemplary method of determining the set of distribution addresses is discussed in detail below with respect to FIG. 6. Additional methods of determining the set of distribution addresses can be implemented in accordance with embodiments of the invention, and the specific method used can vary depending, inter alia, on the type of alert message being transmitted. Merely by way of example, the alert distribution device can be configured as a general rule to implement the address determination procedures described with respect to FIG. 6, but to alert messages meeting certain criteria differently, such as for example, broadcasting an alert message received from a high-priority source (e.g., the U.S. Department of Homeland Security) and/or containing certain text/metadata (e.g., "FOR GENERAL DISTRIBUTION," "FLASH," etc.) to all distribution addresses, irrespective of other address determination guidelines.

At block 526, the alert message can be formatted for distribution to the selected distribution address(es). In accordance with some embodiments, formatting the alert message can comprise segmenting the alert message into data packets of the appropriate length and/or adding appropriate header and tail information to those data packets. In this way, for instance, the alert message can be given a form suitable for transmission to an alert gateway (e.g., via an IP network or the like) and/or directed to the correct distribution addresses. In accordance with certain embodiments, therefore, formatting the message can include encapsulating the alert message into an appropriate number of IP packets, each with appropriate address information to allow transmission of the alert message.

Certain embodiments of the invention allow for multicast distribution of alert messages. Some such embodiments can use a variety of packet distribution techniques such as sparse multicasting, dense multicasting and the like, many of which are well-known in the art. In this way, for instance, an alert message can efficiently be routed to a plurality of distribution addresses by formatting the message using one or more sets of multicast packets. In accordance with other embodiments, however, including, for instance, those embodiments used in environments that do not support multicast packet transmission, the system can provide for unicast transmission of packets. Thus, for each distribution address, a different set of packets can be formatted and transmitted. Based on the disclosure herein, those skilled in the art will appreciate as well that certain embodiments can use a combination of multicast and unicast transmitting schemes in order to distribute messages efficiently. In accordance with further embodiments, alert messages can be formatted to take advantage of quality of service features and/or requirements implemented on certain networks, including for example, those quality of service considerations discussed in various of the applications already incorporated herein by reference.

The alert message then can be transmitted (block 528) to the selected distribution address(es). In some cases, the transmission of the alert message can, as described above, comprise transmission of a series of EP packets comprising the alert message in accordance with the procedures described above and/or any other method known to those skilled in the art. Certain embodiments of the alert distribution device can be configured to anticipate a confirmation message (block 532) from an alert gateway, such that if a confirmation message has not been received by the alert distribution device within a certain period of time (which can, in some cases be predetermined by the subscriber's and/or provider's preferences), the alert distribution device can be configured to retransmit (block 536) the alert transmission to the non-responsive alert gateway. The transmission of the alert information can, in some embodiments, include transmitting the alert message via the same path (e.g., the same route and/or transmission medium) as was used originally to transmit the alert message. In another embodiment, however, if the alert distribution device is in communication with the alert gateway through multiple transmission media and/or data routes, retransmission can comprise transmitting the alert message via a different path. In either case, embodiments of the invention allow for verified transmission of urgent alert messages such that if the alert gateway for which the message is intended does not indicate that the message has been received within a certain period of time, the message can be retransmitted possibly through a different route. This process can continue for a certain period of time and/or number of iterations, at which point if there still has been no confirmation of reception by the alert gateway, the system can log a failure and stop retransmitting the message. Alternatively, retransmission can occur indefinitely.

FIG. 5B illustrates a method 540 of distributing an alert message to various subscriber equipment, which can be located either at the subscriber's premises or away from the subscriber's premises. In some embodiments, the alert message distributed according to methods illustrated by FIG. 5B can be an alert message received from an alert distribution device, for instance, as described above. Thus, the alert message can include an alert and/or associated alert information. At block 544, an alert gateway can receive the alert message. In some embodiments, receiving the alert information can comprise receiving a set of one or more IP packets addressed to the alert gateway. The IP packets thus can comprise the alert message. Optionally, upon reception or in reply of or the alert message, the alert gateway can send a confirmation message, which can, in some embodiments, also be a message comprising one or more IP packets. The confirmation message can be sent to an alert distribution device from which the alert gateway received the alert message and/or an alternative recipient, such as an email address, host, etc. dedicated to receiving such confirmations. The alternative recipient can (but need not) be associated with the provider operating the alert distribution device.

After receiving the alert message, the gateway can inform the subscriber of the alert (block 548). In some cases (for instance, where the alert gateway incorporates an alert notification device, and/or is coupled to an alert notification device), informing the subscriber directly about the alert can include playing an audible signal 552 (which can be an alert tone, a voice message, etc.) and/or displaying a visual signal 556 (which can include illuminating an LED, illustrating a text message and/or the like). In some cases, informing the subscriber about the alert message can include displaying and/or audibly playing the alert for the subscriber, either with or without prompting from the subscriber. In certain embodiments, the alert message can be processed as described elsewhere herein before informing the user about the alert message and/or playing/displaying the alert.

Alternatively and/or in addition to directly informing the subscriber of the alert, the alert gateway can determine which, if any, subscriber devices should receive the alert (block 560). In some instances, determining which subscriber device(s) should receive the alert can include analyzing the nature of the alert message to determine the most appropriate device to receive the alert. Merely by way of example, for an alert message that includes a video signal, the alert gateway can determine, based on the presence of the video signal, that a video display device such as a television, computer, etc. would be the most appropriate device to receive the alert. In other embodiments, the urgency of the alert (which can be conveyed through the additional alert information described in detail above and/or can be ascertained by the alert gateway, for instance, by searching the text of the alert for certain key terms, such as "AMBER," "HOMELAND SECURITY," and/or the like) can be used to determine which devices should receive the alert. Thus, an alert message that is deemed more urgent can be transmitted, for instance, directly to a subscriber's telephone, wireless phone, pager, etc., while relatively less urgent alert messages can be transmitted via e-mail, voicemail message, or the like. Merely by way of example, a particularly urgent message, such as a message regarding homeland security, may be transmitted to all available subscriber equipment simultaneously in order to maximize the probability that the subscriber will receive the message quickly.

The alert gateway can also process the alert message (block 564). Processing the alert message can include any of the processing functions discussed above (for example, with respect to FIG. 5A). In addition, processing can include, for example, decoding and/or translating the alert message (block 568). Merely by way of example, decoding the alert message can include removing formatting information and/or decapsulating the alert message from the format in which it was received, as well as transforming the message (using, for instance, text-to-speech and/or speech-to-text routines known in the art).

In some embodiments, processing the alert message can include extracting closed-captioning information from the alert message (block 572). Thus, for example, if the alert message comprises a television signal, the alert gateway can extract any available closed-captioning information from that television signal and format that closed-captioning text as an electronic mail message, which can then be transmitted to subscriber equipment as desired. In other embodiments the alert gateway can also be configured to convert alert information (block 576), including, for instance, any of the conversation/translation methods described above.

At block 580, the alert can be transmitted to the selected subscriber devices, which can include, inter alia, any of the subscriber equipment described above. Similar to the alert distribution devices described about, the alert gateway can anticipate receiving a confirmation message, for instance from a particular subscriber device (block 584). In some cases, subscriber devices can be configured to transmit confirmation messages upon reception of the alert message while in other cases, subscriber devices can be configured to transmit confirmation messages only upon positive confirmation that the subscriber actually has received a message. Thus, for instance, if an alert message is displayed on a television screen using, for instance, a set-top box, the set-top box can wait for the user to press a certain button on a remote control device before transmitting a confirmation message to the alert gateway. Likewise, a computer can display an alert message in a pop-up window, for instance, and require a user to click on a button before sending a confirmation message to the alert gateway.

In embodiments where the alert distribution device is configured to receive a confirmation from the alert gateway, the alert gateway optionally can be configured not to transmit a confirmation message to the alert distribution device until it has received a confirmation message from a subscriber device. In other cases, a two-stage confirmation process can be employed, whereby the alert gateway sends a first confirmation message when it receives the alert message and a second confirmation message when it receives confirmation that a subscriber device has received the alert (and/or the subscriber actually has reviewed the alert). In this way, embodiments of the invention provide the ability to ensure end-to-end transmission (and, ultimately, reception by the subscriber) of any particular alert message, allowing the provider the ability to continue transmitting an alert message until all necessary subscribers have in fact received that alert message.

In accordance with some embodiments, if the alert gateway sends an alert message to multiple subscriber devices, receipt by the alert gateway of a confirmation message from any of the devices can prompt the alert gateway to send a cancellation/retraction message to the other devices that received the alert, so that the subscriber does not need to confirm and/or clear the alert message from each device that received the alert. In other embodiments, the alert gateway can be configured to send a retraction/cancellation message to the devices after the occurrence of a certain event (which can be, for example, an additional alert message received by the alert gateway that updates or cancels the original alert) or the expiration of the alert. (For instance, the alert information in a message can specify an expiration date/time, as in the case of weather alerts.)

If the alert gateway does not receive a confirmation message within a certain period of time, the alert gateway can be configured to retransmit the information (block 588), by transmitting the alert information repeatedly to the same subscriber device and/or sequentially (and/or in parallel) transmitting the alert information to other subscriber devices. In this way, the alert gateway can be configured to transmit to a plurality of devices according to a priority list, such that, for instance, an alert message may first be transmitted to a computer and, if no response is received from the computer, the alert message can be transmitted to a television; if no confirmation is received from the television, the alert gateway can be configured to call the subscriber's cellular telephone and transmit the alert information that way. As described above, in accordance with certain embodiments, the alert gateway can include a configuration interface which can be a web interface and/or a dedicated connection (e.g., a serial connection to a computer running a configuration application), and this configuration interface can allow the subscriber to specify which subscriber devices and/or in which order certain subscriber devices should receive alerts, according to characteristics of the alert message itself.

FIG. 6 illustrates a method 600 of determining a set of one or more distribution addresses to which a particular alert message should be sent. The exemplary method 600 comprises maintaining a database (block 604). In accordance with some embodiments, the database can be a plurality of databases and/or can be similar to any of the databases described above with respect to the alert distribution system of FIG. 1A. In particular embodiments, the database(s) can be used to store information for determining a set of addresses to which an alert message should be distributed.

As mentioned above, in particular embodiments, the database can be a plurality of databases. Merely by way of example, a first database can store logical addressing information (which can, as discussed below, include dynamically-assigned addresses) for a plurality of gateways, as discussed above, while a second database can store characteristics of a gateway including, for instance, the physical location of a gateway, preferences of a subscriber associated with a gateway, graphic characteristics of the subscriber, capabilities of the gateway, subscriber devices attached to a gateway, and the like. (Those skilled in the art will recognize, however, based on the disclosure herein, that certain embodiments may store this information in a single database. As noted above, the number and organization of the databases are discretionary.) At block 608, characteristics of one or more gateways can be stored, perhaps in one or more of the databases described above. Gateway characteristics can comprise any information that may facilitate identification and/or categorization of a given alert gateway, including, merely by way of example, characteristics described above, such as the physical location of the gateway, preferences of a subscriber associated with a gateway, gateway capabilities, and the like. In some embodiments, the gateway characteristics can include and/or be associated with a identifier for the gateway. The identifier can be unique (at least within the provider's system) and can include, merely by way of example, a physical (MAC) address and/or any other identifier which is capable of identifying a particular gateway.

At block 612, a distribution address can be maintained for a particular alert gateway. The distribution address can be the logical addressing information for the gateway. In some embodiments, for instance those embodiments in which alert messages are transmitted using the Internet Protocol, a distribution address can be an IP address. Those skilled in the art will recognize, however, that other logical addressing schemes can easily be implemented within the scope of the invention. Such logical addresses can be assigned by the provider and can include Ethernet addresses, telephone numbers, and the like. In some embodiments, the distribution address can be maintained in the same and/or a different database as the gateway characteristics.

At block 616, the distribution address for a particular gateway can be associated with the gateway characteristics for that gateway. Association of the distribution address with a set of gateway characteristics allows, for instance, distribution addresses to be searched and/or sorted according to characteristics of the gateways with which those addresses are associated. Consequently, for instance, a search can be performed for all IP addresses that are associated with gateways in particular ZIP code, area code, and the like.

Such an association can be made using a variety of methods known to those skilled in the art, including, for example, establishing a database link between the distribution address and the alert gateway characteristics. By way of illustration, a first database may store characteristics for a particular gateway in a record indexed by the physical address of the gateway, while a second database may contain distribution addresses. Thus, associating a distribution address with gateway characteristics can include establishing a relational link between the particular distribution address in the second database and a particular physical address in the first database.

Other methods of association are possible as well. By way of example, a record for a particular gateway may contain fields for characteristics of that gateway as well as a field for a logical address of that gateway, such that associating the distribution address with the gateway characteristics can include populating the logical address field for that record with a distribution address of that particular gateway. Alternatively, if a first database stores logical addressing information, each record in that database can include not only the logical address by a physical address as well, and that physical address can correspond to a physical address in a second database containing other gateway characteristics.

In some cases, particularly those cases in which distribution addresses are assigned via a dynamic addressing scheme, such as one of those discussed above, the association between the distribution address and the gateway characteristics can be refreshed (block 620), either periodically, on demand, and/or in response to particular events, such as the registration of a new gateway. In some embodiments, the system can be configured to periodically check a host table, DHCP database, and/or the like to determine a physical address associated with a particular distribution address and thereafter to refresh a database record associated with that physical address with the logical address information obtained from that data source. For example, registration of a new DHCP client (or re-registration/refreshing of an existing DHCP lease) can trigger a search for a physical address in the database associated with that DHCP client and update a record associated with that address with a new IP address obtained through the DHCP process. In other embodiments (such as, for instance, embodiments in which logical addresses are maintained on a static basis), it may not be necessary to refresh the association automatically, and associations can be created and/or maintained in an alternative fashion, such as entering information manually on a database front end, to allow that information to be updated in the databases as needed.

At block 624, an alert message is received. Receiving an alert message can comprise any of the like procedures described above. In response to the alert message, a set of one or more selection criteria can be determined (block 628). In some cases, selection criteria can be based on the nature of the alert message. For instance, if the alert message specifies that it applies particularly to a certain geographical location such as an area code, ZIP code or the like, one selection criterion can be that all alert gateways to receive the message reside within that geographical location. In another embodiments, selection criteria can relate to characteristics of an alert gateway. Merely by way of example, if a pollution alert is received, a selection criterion can include all gateways associated with subscribers who have expressed a preference for receiving pollution and/or allergy-related information. Those skilled in the art will appreciate, based on the disclosure herein, that a variety of selection criteria can be established based on different characteristics of a given alert message. Moreover, although certain embodiments of the invention are described herein as relating to the distribution of urgent public information, those skilled in the art can appreciate that other embodiments of the invention are not so limited and can provide systems and methods for selectively distributing any variety of information in accordance with a subscriber's preferences. Thus, a subscriber may indicate via preferences (which can be maintained by the subscriber and/or provider at the gateway-and optionally uploaded to an alert distribution device-and/or maintained by the subscriber/provider at the distribution device) that the subscriber would like to receive alerts related to certain securities, movie showtimes, etc., and these preferences can be stored as gateway characteristics, which then can be searched by appropriate selection criteria.

At block 632, a database can be searched for gateways meeting with selection criteria. Merely by way of example, if an alert applies only to a specific geographic area, the database can be searched for all gateways located within that geographic area. The distribution addresses associated with gateways can included in the search results can be identified as addresses to which an alert should be sent (block 636). Those addresses can be compiled (either implicitly or explicitly) into the set of distribution addresses to receive the alert (block 640), and the alert message then can be transmitted to the identified distribution addresses, perhaps using one of the methods discussed above (block 644).

While the functions discussed with respect to the methods illustrated in FIGS. 5A, 5B and 6 have been described generally with respect to alert distribution devices and alert gateways, it should be recognized that these functions often can be performed by specific structures within these devices. For instance, based on the disclosure herein, one skilled in the art will appreciate that a processor executing instructions from appropriate software, perhaps in conjunction an interface, can perform these functions. As discussed above, however, the methods of the invention are not limited to any particular structural embodiments.

In conclusion, the present invention provides novel devices, systems and methods for providing information to a subscriber. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method of providing an alert to a subscriber, the method comprising:
    providing an alert gateway device at a subscriber premises, the alert gateway device being configured to receive an alert message;
    receiving an alert message at the alert gateway device, the alert message comprising an alert;
    processing the alert message;
    determining how to provide the alert to the subscriber, wherein the determination includes determining which one or more of a plurality subscriber devices should receive the alert message;
    based on the determination of how to provide the alert to the subscriber, formatting the alert in such a way to facilitate the provision of the alert in a determined manner, wherein formatting the alert includes processing the alert into an electronic message that can be received by one of the subscriber devices; and
    providing the alert to the subscriber according to the determination of how to provide the alert to the subscriber.

2. A method of providing an alert to a subscriber as recited in claim 1, further comprising:
    allowing the subscriber to provide preferences that determine, with respect to a given alert, how the alert shall be provided to the subscriber.

3. A system for providing alerts to a subscriber, the system comprising:
    at least one communication medium;
    a plurality of subscriber devices in communication with the at least one communication medium and configured to receive an alert and provide the alert to the subscriber;
    an alert gateway device located at a subscriber premises, the alert gateway comprising at least one external interface and at least one internal interface, the at least one internal interface being in communication with the at least one communication medium, the alert gateway being configured to:
        receive an alert message via the at least one external interface, the alert message comprising an alert;
        interpret the alert message;
        determine how to provide the alert to the subscriber, wherein the determination includes determining which one or more of the plurality subscriber devices should receive the alert message;

based on the determination of how to provide the alert to the subscriber, format the alert in such a way to facilitate the provision of the alert in a determined manner wherein formatting the alert includes processing the alert into an electronic message that can be received by one of the subscriber devices;

transmit the alert via the at least one internal interface, such that the alert is received by the at least one subscriber device and provided to the subscriber according to the determination of how to provide the alert to the subscriber.

4. A system as recited in claim 3, wherein the at least one subscriber device is a plurality of subscriber devices.

5. A system as recited in claim 4, wherein the at least one communication medium is a plurality of communication media, and wherein the at least one internal interface is a plurality of internal interfaces, such that each of the plurality of internal interfaces is in communication with one of the plurality of communication media and each of the plurality of subscriber devices is in communication with one of the plurality of communication media.

6. A system as recited in claim 4, wherein the alert gateway device is further configured to determine which of the plurality of subscriber devices shall receive the alert.

7. In a relationship between a subscriber and at least one alert provider, an alert gateway device located at a subscriber premises for providing an alert to a subscriber, the alert gateway device being in communication with a communication network, wherein the alert gateway device includes a first, external interface, a second, internal interface and at least one processor, the alert gateway device being configured to:

receive an alert message from the alert provider via the first interface, the alert message comprising an alert and associated alert information;

process the alert to determine how the alert shall be handled, wherein processing the alert includes formatting the alert into an electronic message for reception by one of a plurality of subscriber devices, and, wherein the determination includes determining which one or more of the plurality of subscriber devices should receive the alert message; and based on the determination of how the alert shall be handled, take at least one specific action with respect to the alert.

8. An alert gateway device as recited in claim 7, wherein processing the alert comprises determining that the alert does not apply to the subscriber, and wherein taking at least one specific action with respect to the alert comprises ignoring the alert.

9. An alert gateway device as recited in claim 7, wherein processing the alert comprises determining whether the alert is valid.

10. An alert gateway device as recited in claim 7, wherein processing the alert comprises evaluating the alert information to determine the nature of the alert.

11. An alert gateway device as recited in claim 7, wherein processing the alert comprises converting the alert from a first format to a second format.

12. An alert gateway device as recited in claim 7, wherein the second interface is in communication with a subscriber device, wherein processing the alert comprises determining that the subscriber shall receive the alert, and wherein taking at least one specific action with respect to the alert comprises transmitting the alert via the second interface for reception by the subscriber device, such that the alert is provided to the subscriber by the subscriber device.

13. An alert gateway device as recited in claim 7, wherein the alert gateway device further comprises alert means for providing an alert directly to a user, and wherein taking at least one specific action with respect to the alert comprises notifying the subscriber about the alert via the alert means.

14. An alert gateway device as recited in claim 7, wherein the alert means is incorporated within the second interface.

15. An alert gateway device as recited in claim 7, wherein the at least one alert provider comprises a plurality of alert providers.

16. An alert gateway as recited in claim 15, wherein processing the alert comprises determining from which of the plurality of alert providers the alert message was received.

17. An alert gateway device as recited in claim 7, wherein taking at least one specific action comprises anticipating an acknowledgement that the subscriber received the alert.

18. An alert gateway device as recited in claim 17, wherein the at least one subscriber device is a plurality of subscriber devices, wherein taking at least one specific action comprises, if an acknowledgment is received by at least one of the plurality of subscriber devices, transmitting a message to retract the alert from the other subscriber devices.

19. An alert gateway device as recited in claim 17, wherein taking at least one specific action further comprises transmitting a retraction message for reception by the at least one subscriber device, wherein the retraction message signifies that the alert no longer needs to be provided to the subscriber.

20. An alert gateway device as recited in claim 17, wherein taking at least one specific action comprises, if no acknowledgment is received within a certain period, retransmitting the alert.

21. An alert gateway device as recited in claim 20, wherein the at least one subscriber device is a first subscriber device, and wherein retransmitting the alert comprises transmitting the alert for reception by a second subscriber device.

22. An alert gateway device as recited in 17, wherein taking at least one specific action comprises, if no acknowledgement is received within a certain period, transmitting for reception by the alert provider a notification that the alert was not received by the subscriber.

23. An alert gateway device as recited in claim 7, wherein the alert gateway device includes means for determining the location of the alert gateway device.

24. An alert gateway device as recited in claim 7, wherein the alert gateway device is configured to allow the subscriber to provide preferences that determine, with respect to a given alert, the at least one specific action that shall be taken.

25. An alert gateway device as recited in claim 7, wherein the subscriber is a plurality of subscribers, and wherein taking at least one specific action with respect to the alert comprises taking at least one specific action for each subscriber with respect to the alert.

26. In a relationship between a subscriber and at least one alert provider, a method of providing an alert to a subscriber, the method comprising:

providing an alert gateway located at a subscriber premises in communication with a communication network, wherein the alert gateway device includes a first, external interface, a second, internal interface and at least one processor;

receiving via the first interface an alert message comprising an alert and associated alert information;

processing the alert to determine how the alert shall be handled, wherein processing the alert includes formatting the alert into an electronic message for reception by one of a plurality of subscriber devices and wherein the determination includes determining which one or more of the plurality of subscriber devices should receive the alert message; and based on the determination of how the alert shall be handled, taking at least one specific action with respect to the alert.

27. In a relationship between a subscriber and at least one alert provider, a system for providing an alert to a subscriber, the system comprising:

an alert gateway device located at a subscriber premises in communication with a communication network, wherein the alert gateway device includes a first, external interface, a second, internal interface and at least one processor, the alert gateway device being configured to:

receive an alert message from the alert provider via the first interface, the alert message comprising an alert and associated alert information;

process the alert to determine how the alert shall be handled, wherein processing the alert includes formatting the alert into an electronic message for reception by one of a plurality of subscriber devices and wherein the determination includes determining which one or more of the plurality of subscriber devices should receive the alert message; and based on the determination of how the alert shall be handled, take at least one specific action with respect to the alert;

at least one communication medium in communication with the second interface; and at least one subscriber device in communication with the alert gateway device via the communication medium, the at least one subscriber device being configured to receive an alert from the alert gateway and notify the subscriber about the alert.

28. A system as recited in claim 27, wherein the at least one communication medium is a plurality of communication media.

29. A system as recited in claim 28, wherein the second, internal interface is a plurality of internal interfaces, and wherein each of the plurality of internal interfaces is in communication with one of the plurality of communication media.

30. A system as recited in claim 27, wherein the at least one subscriber device is a plurality of subscriber devices.

31. A system as recited in claim 30, wherein processing the alert comprises determining a subset of the plurality of subscriber devices that shall receive the alert, and wherein taking at least one specific action with respect to the alert comprises transmitting the alert for reception to the subset of the plurality of subscriber devices that shall receive the alert.

32. A system as recited in claim 27, wherein the at least one subscriber device is configured to transmit an acknowledgement for reception by the alert gateway device that that the alert was received by the subscriber.

33. A system as recited in claim 32, wherein the at least one subscriber device is configured to accept a notification from the subscriber that the subscriber received the alert, and wherein the at least one subscriber device is further configured not to transmit the acknowledgment until receiving the notification from the subscriber.

* * * * *

UNITED STATES PATENT AND TRADEMARK OFFICE
CERTIFICATE OF CORRECTION

| | |
|---|---|
| PATENT NO. | : 8,050,281 B2 |
| APPLICATION NO. | : 10/854738 |
| DATED | : November 1, 2011 |
| INVENTOR(S) | : Steven M. Casey et al. |

It is certified that error appears in the above-identified patent and that said Letters Patent is hereby corrected as shown below:

Column 4, Line 65, delete "anticipate a. confirmation" and insert --anticipate a confirmation--, therefor.
Column 5, Line 22, delete "device may in" and insert --device may be in--, therefor.
Column 6, Line 29, delete "comprise a providing" and insert --comprise providing--, therefor.
Column 7, Line 25, delete "device that that" and insert --device that--, therefor.
Column 7, Line 51, delete "interface devices," and insert --interface device,--, therefor.
Column 9, Line 11, delete "may the ultimate" and insert --may be the ultimate--, therefor.
Column 9, Line 54, delete "that he alert" and insert --that the alert--, therefor.
Column 9, Line 54, delete "108 can one" and insert --108 can be one--, therefor.
Column 10, Line 3, delete "be one ore more" and insert --be one or more--, therefor.
Column 11, Line 7, delete "bases. In some" and insert --basis. In some--, therefor.
Column 11, Line 41, delete "alert to via a" and insert --alert via a--, therefor.
Column 12, Line 2, delete "the nature the" and insert --the nature of the--, therefor.
Column 13, Line 32, delete "embodiments the" and insert --embodiments of the--, therefor.
Column 14, Line 6, delete "communication alert" and insert --communication with an alert--, therefor.
Column 17, Line 66, delete "192 can configured" and insert --192 can be configured--, therefor.
Column 18, Line 48, delete "seen that body" and insert --seen that the body--, therefor.
Column 20, Line 23, delete "one or microprocessors" and insert --one or more microprocessors--, therefor.
Column 25, Line 48, delete "illustrated on" and insert --illustrated in--, therefor.
Column 25, Line 53, delete "101061", therefor.
Column 26, Line 35, delete "than the procedures" and insert --that the procedures--, therefor.
Column 33, Line 63, delete "gateways can included" and insert --gateways included--, therefor.
Column 34, Line 10, delete "conjunction an" and insert --conjunction with an--, therefor.
Column 36, Line 36, Claim 22, delete "recited in 17," and insert --recited in claim 17,--, therefor.

Signed and Sealed this
Twenty-ninth Day of May, 2012

David J. Kappos
*Director of the United States Patent and Trademark Office*